United States Patent
Yamazaki et al.

(10) Patent No.: US 9,694,833 B2
(45) Date of Patent: Jul. 4, 2017

(54) DISK BRAKE AND DISK BRAKE FOR RAILWAY VEHICLE

(71) Applicant: AKEBONO BRAKE INDUSTRY CO., LTD, Tokyo (JP)

(72) Inventors: Akihiko Yamazaki, Tokyo (JP); Yoshikazu Harigai, Tokyo (JP); Yuichi Okada, Tokyo (JP); Takayuki Shindo, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/958,019

(22) Filed: Dec. 3, 2015

(65) Prior Publication Data

US 2016/0159375 A1    Jun. 9, 2016

(30) Foreign Application Priority Data

Dec. 4, 2014  (JP) ................................ 2014-245944
Nov. 4, 2015  (JP) ................................ 2015-216702

(51) Int. Cl.
  *B61H 5/00*  (2006.01)
  *F16D 55/224*  (2006.01)
  *F16D 55/226*  (2006.01)
  *F16D 55/00*  (2006.01)
  *F16D 121/02*  (2012.01)

(52) U.S. Cl.
  CPC ............. *B61H 5/00* (2013.01); *F16D 55/226* (2013.01); *F16D 55/2245* (2013.01);
  (Continued)

(58) Field of Classification Search
  CPC ..... B61H 5/00; F16D 55/226; F16D 55/2245; F16D 2055/0016; F16D 2121/02;
  (Continued)

(56) References Cited

U.S. PATENT DOCUMENTS 4,860,858 A * 8/1989  Erben ............... F16D 55/22655
                                              188/196 P
4,865,161 A * 9/1989  Schneider ......... F16D 55/22655
                                              188/196 P
(Continued)

FOREIGN PATENT DOCUMENTS

DE          4119928 A1 * 12/1992 ....... F16D 55/22655
JP       H06-32773 U     4/1994

OTHER PUBLICATIONS

Machine translation in English for DE 4119928A1; Inventor Herbert et al.; 3 pages; Retrieve Date: Oct. 26, 2016.*

*Primary Examiner* — Thomas J Williams
*Assistant Examiner* — Mariano Sy
(74) *Attorney, Agent, or Firm* — Drinker Biddle & Reath LLP

(57) ABSTRACT

A disk brake includes a floating caliper, a pair of brake pads, a driving piston and a caliper return mechanism. The floating caliper includes a base portion which is slidably supported via a guide pin to a support and a pair of pressing arms which extend from the base portion to pinch a disk rotor. The brake pads are provided in tip portions of the pressing arms so as to face side surfaces of the disk rotor. The driving piston is provided on one of the pressing arms so as to drive one of the brake pads toward one of the side surfaces. The caliper return mechanism is arranged in at least one of both end portions of the guide pin on a side opposite to the driving piston side so as to elastically bias the base portion to the side opposite to the driving piston side.

10 Claims, 13 Drawing Sheets

(52) U.S. Cl.
CPC .............. *F16D 2055/0016* (2013.01); *F16D 2055/0029* (2013.01); *F16D 2121/02* (2013.01)

(58) Field of Classification Search
CPC ........... F16D 2055/0029; F16D 55/225; F16D 55/2255; F16D 65/0087; F16D 65/0093; F16D 65/095; F16D 65/183
USPC ......... 188/72.3, 73.42, 73.43, 733.44, 73.45, 188/71.8, 196 D, 196 P
See application file for complete search history.

(56) References Cited

U.S. PATENT DOCUMENTS

| | | | | |
|---|---|---|---|---|
| 6,722,477 B1* | 4/2004 | Wolfsteiner | ............ | B61H 5/00 188/173 |
| 8,763,766 B2* | 7/2014 | Ebner | ................ | F16D 65/567 188/196 D |
| 8,794,393 B2* | 8/2014 | Argirovski | .......... | F16D 55/2245 188/196 D |
| 9,371,078 B2* | 6/2016 | Tsurusaki | ................ | B61H 5/00 |
| 9,382,956 B2* | 7/2016 | Suzuki | ................ | B61H 5/00 |
| 2004/0074709 A1* | 4/2004 | Krug | ................ | B60T 13/743 188/72.1 |
| 2010/0044167 A1* | 2/2010 | Suzuki | ................ | B61H 5/00 188/72.3 |
| 2014/0216864 A1* | 8/2014 | Suzuki | ................ | F16D 65/18 188/72.3 |
| 2014/0299423 A1* | 10/2014 | Suzuki | ................ | B61H 5/00 188/71.6 |
| 2014/0345982 A1* | 11/2014 | Suzuki | ................ | B61H 5/00 188/71.6 |
| 2015/0053510 A1* | 2/2015 | Suzuki | ................ | B61H 5/00 188/71.6 |

* cited by examiner

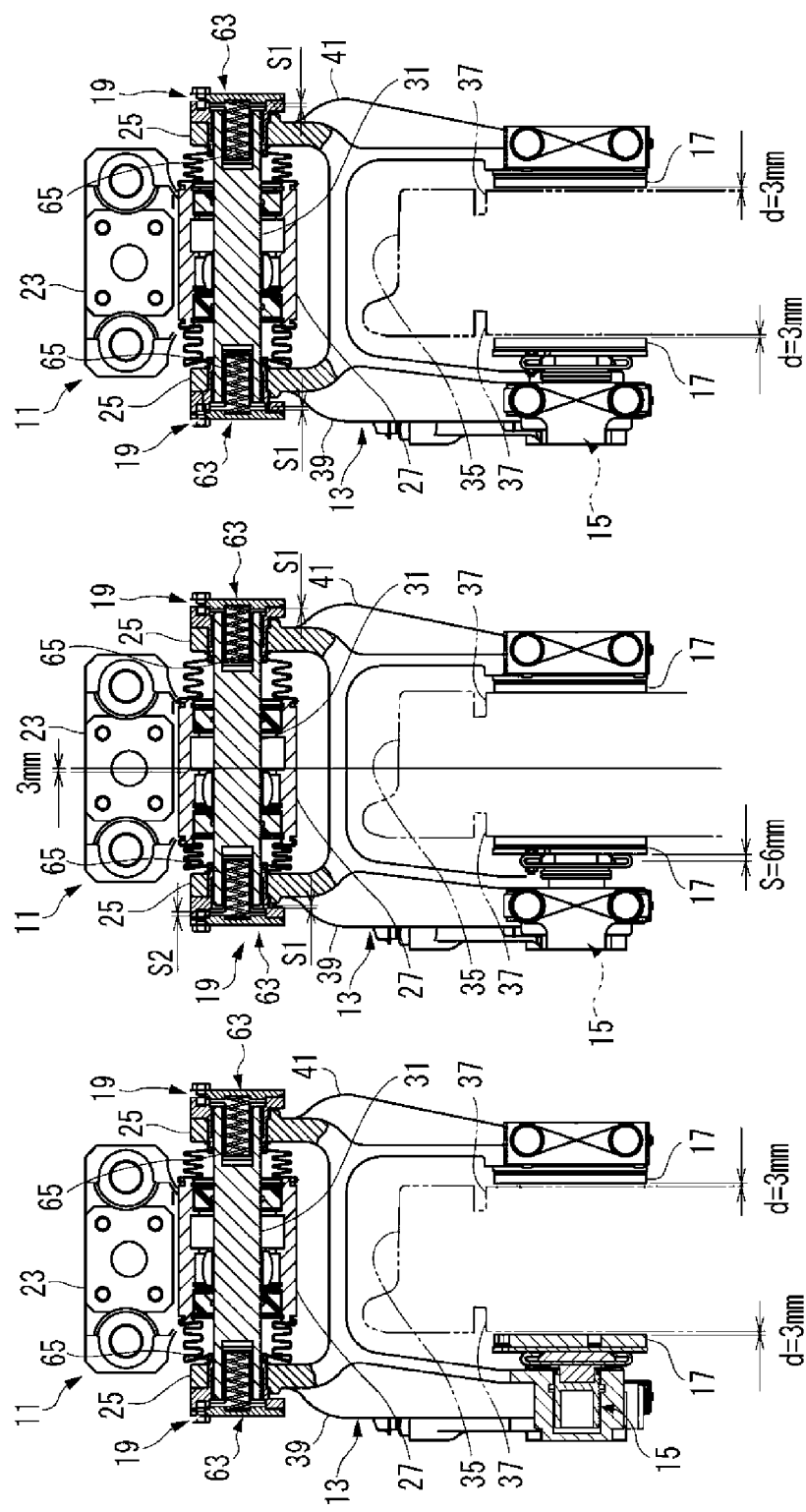

DISK BRAKE AND DISK BRAKE FOR RAILWAY VEHICLE

CROSS REFERENCE TO RELATED APPLICATIONS

This application is based on Japanese Patent Application (No. 2014-245944) filed on Dec. 4, 2014 and Japanese Patent Application (No. 2015-216702) filed on Nov. 4, 2015, the contents of which are incorporated herein by reference.

BACKGROUND

The present invention relates to a disk brake and a disk brake for a railway vehicle.

A floating caliper type disk brake that prevents a drag phenomenon of a brake pad has been known (refer to Patent Document 1).

This floating caliper type disk brake is configured such that one of pads (brake pads) is fixed to an arm at one end of a caliper (floating caliper) where both end portions are open in a bifurcated manner and the other pad is pushed out toward a rotor by a piston (driving piston) disposed on an arm on the side opposite to the arm. Two guide pins are fixed to the arm at the other end of the caliper, and these guide pins are supported to be capable of sliding in an axial direction by a tubular portion of a support coupled with a bogie frame or the like.

In other words, as illustrated in FIG. 13A, a pair of upper and lower guide pins 503 (only that on an upper side being illustrated herein) are laid across a pair of bifurcated arms 501 of the caliper and are fixed to the arms 501 by a flange 505 and a nut (not illustrated), respectively. A pair of holding rings 509 are mounted, pinched by stepped portions 511 and snap rings (not illustrated), on an inner surface of a tubular portion 507 of the support (not illustrated) surrounding the guide pin 503 on the upper side. Retraction rubber rings (friction rubber rings) 513 that have an H-shaped cross-sectional shape are mounted inside the holding rings 509.

In the above-described configuration, tip portions of projections 515 in inner peripheries of the retraction rubber rings 513 that have the H-shaped cross-sectional shape directly abut against an outer peripheral surface of the guide pin 503, as illustrated in FIG. 13A, during non-braking.

When braking is performed, a reaction force by which the pad is pressed against the rotor causes the guide pin 503 to be moved along with the caliper in the direction of arrow A that is illustrated in FIG. 13B. In addition, friction between the outer peripheral surface of the guide pin 503 and the tip portions of the projections 515 causes the projections 515 of the retraction rubber rings 513 to be bent (twisted) in the direction of arrow A.

When the braking is released, the retraction rubber rings 513 return to original postures based on resilience thereof, and the guide pin 503 is moved in the direction of arrow B that is illustrated in FIG. 13C due to friction between the tip portions of the projections 515 in the inner peripheries and the outer peripheral surface of the guide pin 503. Then, the caliper that is coupled with the guide pin 503 is slightly moved in the direction of arrow B, so that the pad fixed to the caliper is slightly separated from the rotor. Then, a vehicle can be started in a light manner. When the vehicle begins to travel, a gap between the pad and the rotor sufficiently increases because of vibration or the like.

According to this floating caliper type disk brake, the pad fixed to the caliper is pulled apart from the rotor by the retraction rubber ring 513 immediately after the release of the braking. Accordingly, drag can be prevented, an increase in starting torque can be prevented, and lining wear can be prevented.

[Patent Document 1] JP-UM-A-6-32773

SUMMARY

The present invention has been made in view of the above-described circumstances, and an object thereof is to provide a disk brake and a disk brake for a railway vehicle with which a caliper return force can be easily set and a desired caliper return operation can be stably performed so that drag of a pad can be reliably prevented.

According to one advantageous aspect of the present invention, there is provided a disk brake comprising:

a floating caliper including a base portion which is slidably supported via a guide pin with respect to a tubular supporting portion of a support and a pair of pressing arms which extend from the base portion to positions where a disk rotor is pinched from both sides in an axial direction;

a pair of brake pads provided in respective tip portions of the pressing arms so as to face side surfaces of the disk rotor;

a driving piston provided on one of the pressing arms so as to drive one of the brake pads toward one of the side surfaces of the disk rotor; and a caliper return mechanism arranged in at least one of both end portions of the guide pin on a side opposite to the driving piston side so as to elastically bias the base portion slidably supported by the guide pin to the side opposite to the driving piston side.

The caliper return mechanism may include
a spring accommodating member which has a bottomed tubular shape, is mounted in a spring accommodating portion disposed in the end portion of the guide pin, and has an open end flange engaged with an edge of an opening of the spring accommodating portion,
a spring receiving member covering the opening of the spring accommodating portion and fixed to the base portion, and
a compression spring member interposed between the spring receiving member disposed with a predetermined gap from the open end flange and a bottom portion of the spring accommodating member.

The spring receiving member may include a slide bearing for slidably supporting the base portion with respect to the guide pin.

The spring receiving member may include
a guide pin supporting portion which has cylindrical shape and is fixed to the base portion so that the base portion is slidably supported with respect to the guide pin via the slide bearing, and
a spring supporting portion which abuts against an end of the compression spring member and is fixed to the guide pin supporting portion so as to cover an outside open end of the guide pin supporting portion.

In the disk brake, an O-ring may be interposed between the guide pin supporting portion and the spring supporting portion.

The spring supporting portions of the caliper return mechanisms arranged in both of the end portions of the guide pin may be fixed to the base portions by a bolt shaft penetrating the bottom portion of the spring accommodating member and the guide pin having hollow shape in a central axial direction and a nut screwed with a tip of the bolt shaft.

In the disk brake, O-rings may be respectively interposed between the spring supporting portion and the bolt shaft and between the spring supporting portion and the nut.

In the disk brake, detent mechanisms may be disposed between the guide pin supporting portion and the spring supporting portion and between the spring supporting portion and the bolt shaft so as to regulate relative rotations thereof.

The caliper return mechanism arranged in the end portion of the guide pin on the driving piston side may include a stopper portion, in the spring receiving member, for regulating a movement of the spring accommodating member in the axial direction with respect to the base portion to a predetermined gap.

According to the present invention, there is also provided a disk brake for a railway vehicle including the disk brake as above.

BRIEF DESCRIPTION OF DRAWINGS

FIGS. 6A to 6C are a set of explanatory drawings showing operations of the disk brake that is illustrated in FIG. 1, in which FIG. 6A is an explanatory drawing showing an initial operation, FIG. 6B is an explanatory drawing showing an operation during braking, and FIG. 6C is an explanatory drawing showing an operation during a slow brake opening.

DETAILED DESCRIPTION OF EXEMPLIFIED EMBODIMENTS

Figure 1:
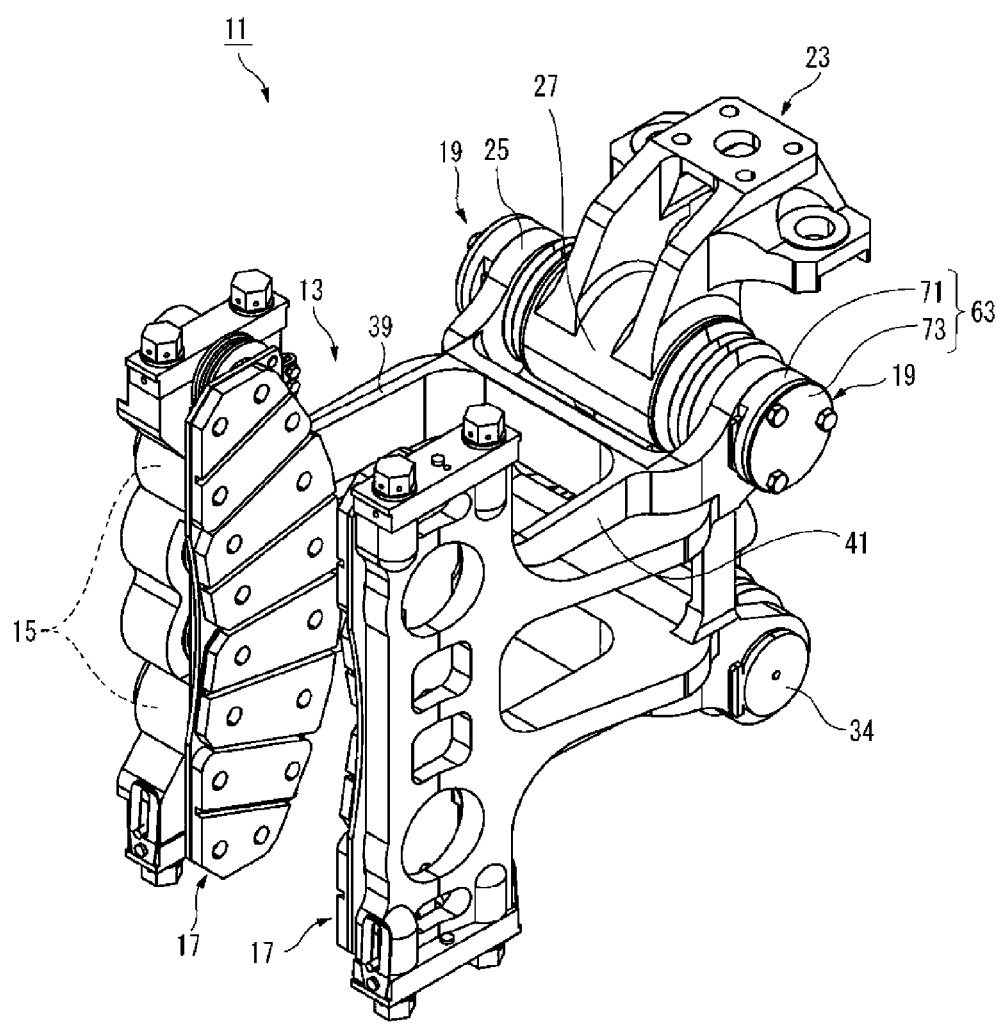
FIG. 1 is a perspective view of a disk brake according to a first embodiment of the present invention.
Figure 2:
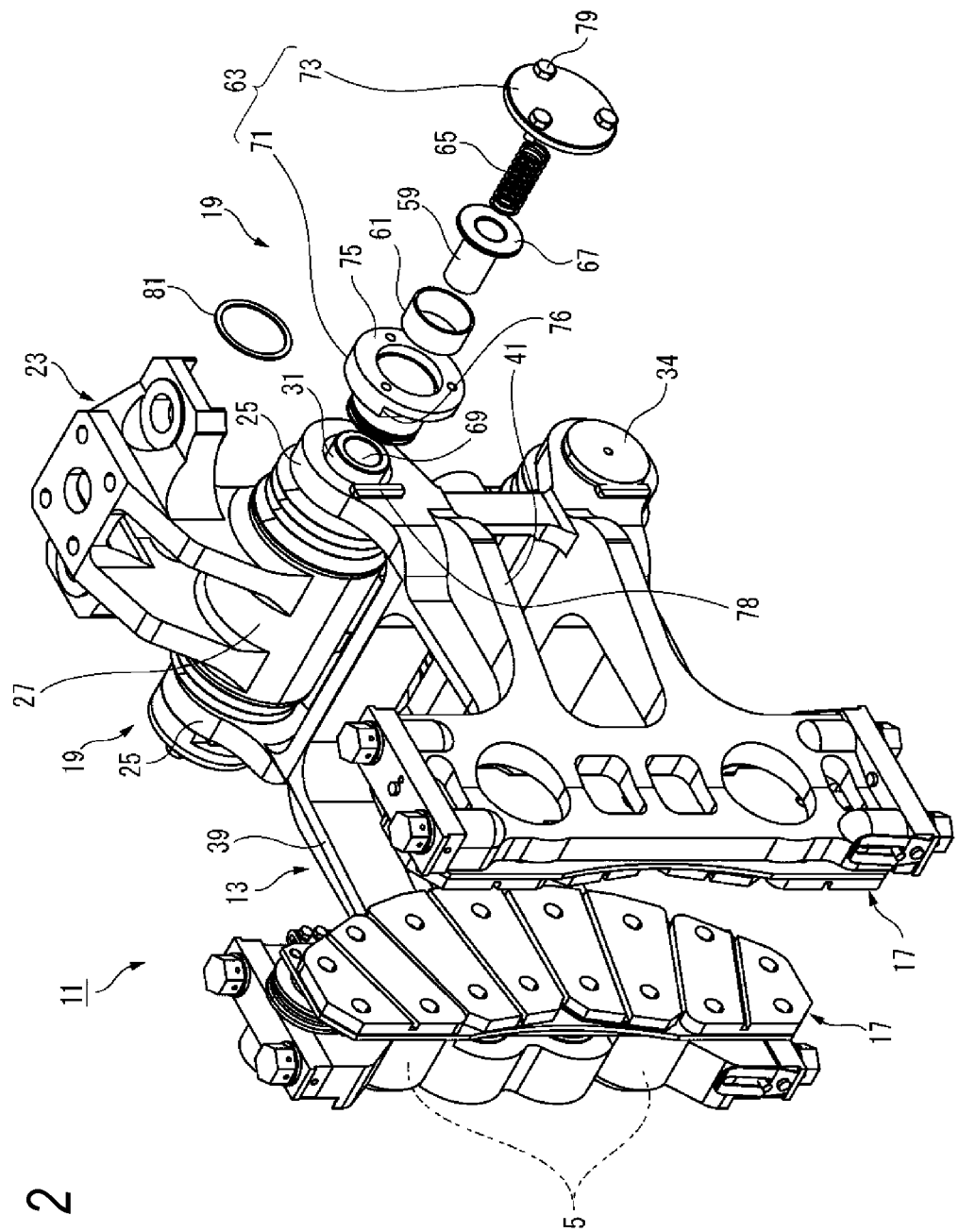
FIG. 2 is an exploded perspective view of the disk brake that is illustrated in FIG. 1.
Figure 3:
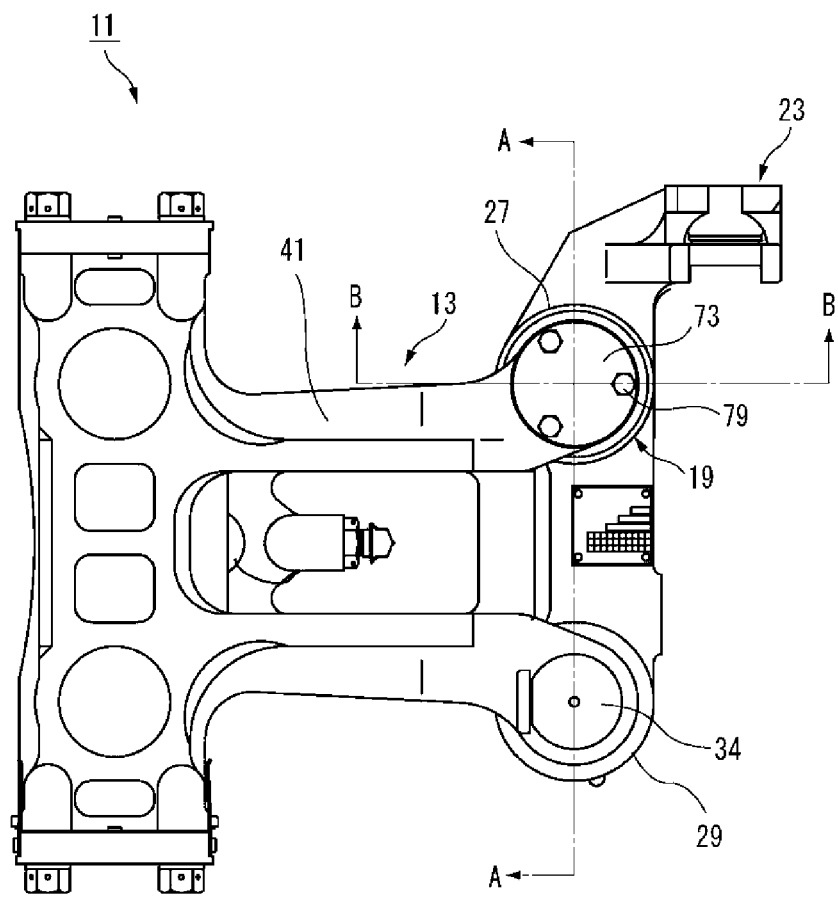
FIG. 3 is a side view of the disk brake that is illustrated in FIG. 1.

In the above-described floating caliper type disk brake according to the prior art, however, a retraction effect (return force) and return amount of the caliper are managed by the retraction rubber rings 513 alone, and thus a desired caliper return operation might not be stably achieved due to manufacturing variations, dimensional tolerances, and the like of the retraction rubber rings 513, which is problematic. In other words, the retraction rubber rings 513 have their own limitations in obtaining the return force on their own. In addition, the return amount is required to be fine-tuned with respect to calipers with different specifications, and thus a structure has been desired that allows the fine-tuning of the return amount without any additional machining of the existing calipers (castings).

The present invention has been made in view of the above-described circumstances, and an object thereof is to provide a disk brake and a disk brake for a railway vehicle with which a caliper return force can be easily set and a desired caliper return operation can be stably performed so that drag of a pad can be reliably prevented.

Hereinafter, embodiments of the present invention will be described with reference to accompanying drawings.

The following description relates to an example of a case where a floating caliper type disk brake 11 according to a first embodiment of the present invention is used as a disk brake for a railway vehicle as illustrated in FIGS. 1 to 5. The disk brake 11 can also be suitably used as a brake device for various industrial driving devices generating a braking force with respect to a rotary member, examples of which include an elevator.

The floating caliper type disk brake 11 according to this first embodiment has, as its main components, a floating caliper 13 that has a piston side pressing arm 39 and an anti-piston side pressing arm 41 which are a pair of pressing arms extending from base portions 25 slidably supported by a support 23 coupled with a bogie frame (not illustrated) to positions where disk rotors 37 and 37 mounted on both side surfaces of a vehicle wheel 35 (refer to FIGS. 6A to 6C) are pinched from both sides in an axial direction, a pair of brake pads 17 and 17 that are respectively disposed on the piston side pressing arm 39 and the anti-piston side pressing arm 41 to face outside surfaces of the disk rotors 37 and 37, a driving piston 15 (refer to a partial broken portion in FIG. 6A) that is disposed on the piston side pressing arm 39, and caliper return mechanisms 19 that are arranged in both end portions of an upper stage guide pin (guide pin) 31.

In upper and lower portions of the base portions 25 of the floating caliper 13, the upper stage guide pin 31 and a lower stage guide pin 33 that are guide pins are laid across an upper stage tubular supporting portion 27 and a lower stage tubular supporting portion 29 that are a pair of upper and lower tubular supporting portions of the support 23, respectively. The base portions 25 of the floating caliper 13 are slidably supported by the upper stage tubular supporting portion 27 and the lower stage tubular supporting portion 29 via the upper stage guide pin 31 and the lower stage guide pin 33. Both ends of the upper stage guide pin 31 are retained in the base portions 25 by the caliper return mechanisms 19. The lower stage guide pin 33 is fixed to the base portions 25 by a flange 34 and a nut 36. The piston side pressing arm 39 and the anti-piston side pressing arm 41 that are the pair of pressing arms extend from the base portions 25 of the floating caliper 13 to the positions where the disk rotors 37 mounted on both of the side surfaces of the vehicle wheel 35 (refer to FIGS. 6A to 6C) are pinched from both of the sides in the axial direction. Bifurcated arm portions that are parallel to each other constitute the piston side pressing arm 39 and the anti-piston side pressing arm 41 according to this first embodiment.

The brake pads 17 are disposed on respective tip portions of the piston side pressing arm 39 and the anti-piston side pressing arm 41 to face the outside surfaces of the disk rotors 37 that are mounted on both of the side surfaces of the vehicle wheel 35. In the description of this first embodiment, a structure in which a brake operation is performed by lining surfaces of the brake pads 17 pressing the disk rotors 37 will be described as an example. As a matter of course, the disk brake 11 may be configured to perform braking by directly clamping both of the side surfaces of the vehicle wheel 35.

In this first embodiment, the driving piston 15 is disposed on the piston side pressing arm 39, which is one of the pair of pressing arms, so as to drive one of the brake pads 17 toward a side surface of the disk rotor 37, In this first embodiment, the caliper return mechanisms 19 are arranged in both of the end portions of the upper stage guide pin 31. The caliper return mechanisms 19 elastically bias the base portions 25 that are slidably supported with respect to the upper stage guide pin 31 to the side which is opposite to the side of the driving piston (hereinafter, referred to as a driving piston side). The caliper return mechanism 19 according to the present invention may be disposed at least in the end portion (right end portion in FIG. 5) of the upper stage guide pin 31 that is on the side opposite to the driving piston side. The caliper return mechanisms 19 will be described in detail later. In this first embodiment, an example in which the caliper return mechanisms 19 are disposed only on the upper stage guide pin 31 will be described. However, the caliper return mechanisms 19 may be disposed on both the upper stage guide pin 31 and the lower stage guide pin 33.

Figure 5:
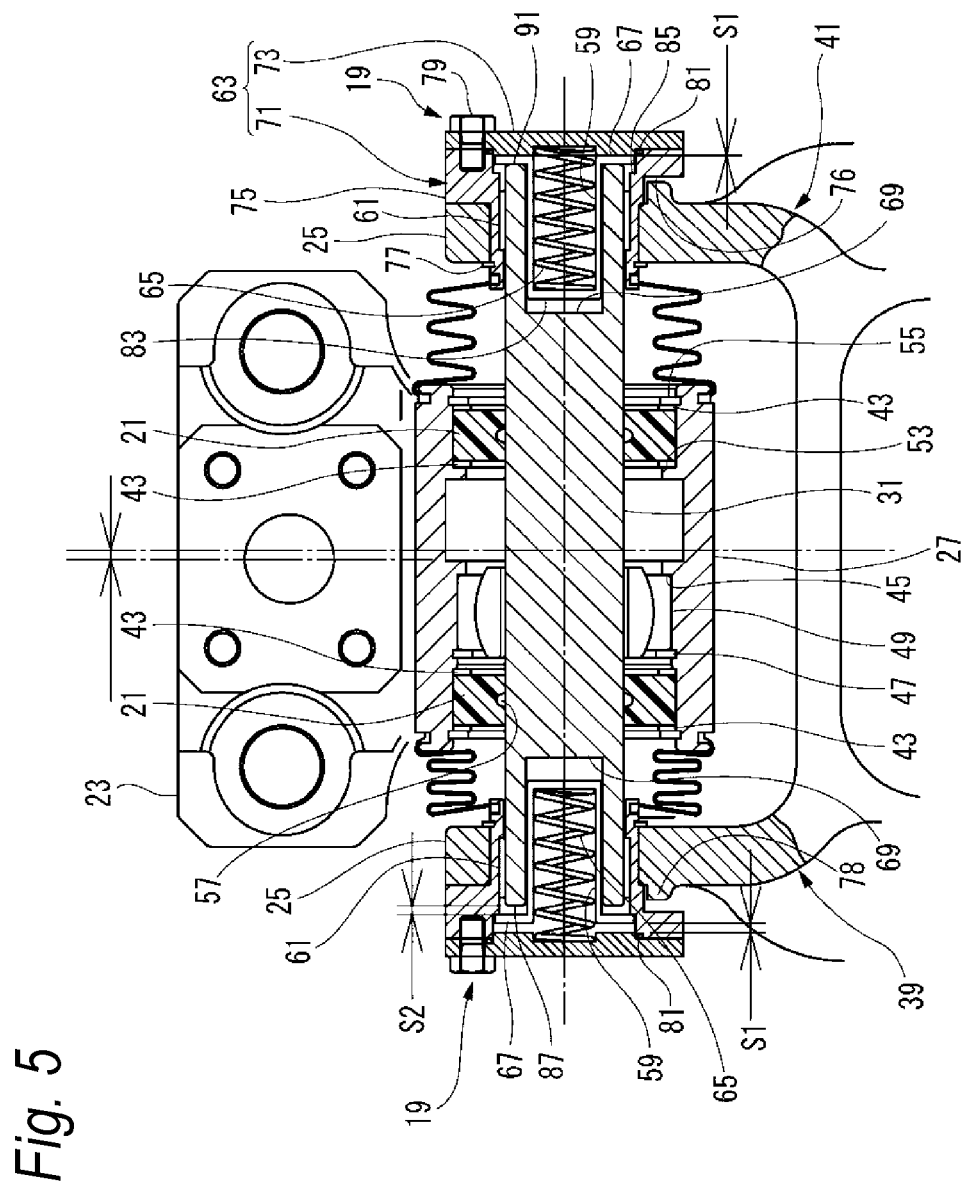
FIG. 5 is a cross-sectional view taken along line B-B in FIG. 3.

A pair of friction rubber rings 21 are fitted into the upper stage tubular supporting portion 27 of the support 23. As illustrated in FIG. 5, washer members 43 are arranged on both sides of the friction rubber rings 21 in the axial direction. The washer members 43 regulate a movement of the friction rubber rings 21 in a direction along the upper stage guide pin 31.

An aligning bearing 49 is fixed by a stepped portion 45 and a snap ring 47 at the center of an inner peripheral surface of the upper stage tubular supporting portion 27 surrounding the upper stage guide pin 31. The aligning bearing 49 supports the upper stage guide pin 31 to be capable of oscillation. The aligning bearing 49 can bring sliding surfaces of the brake pads 17 and the disk rotors 37 into close contact with each other during braking even when the upper stage guide pin 31 and the upper stage tubular supporting portion 27 of the support 23 become non-parallel to each other with the vehicle wheel 35 that is resiliently supported by the bogie frame relatively displaced (oscillating) with respect to the bogie frame.

Figure 4:
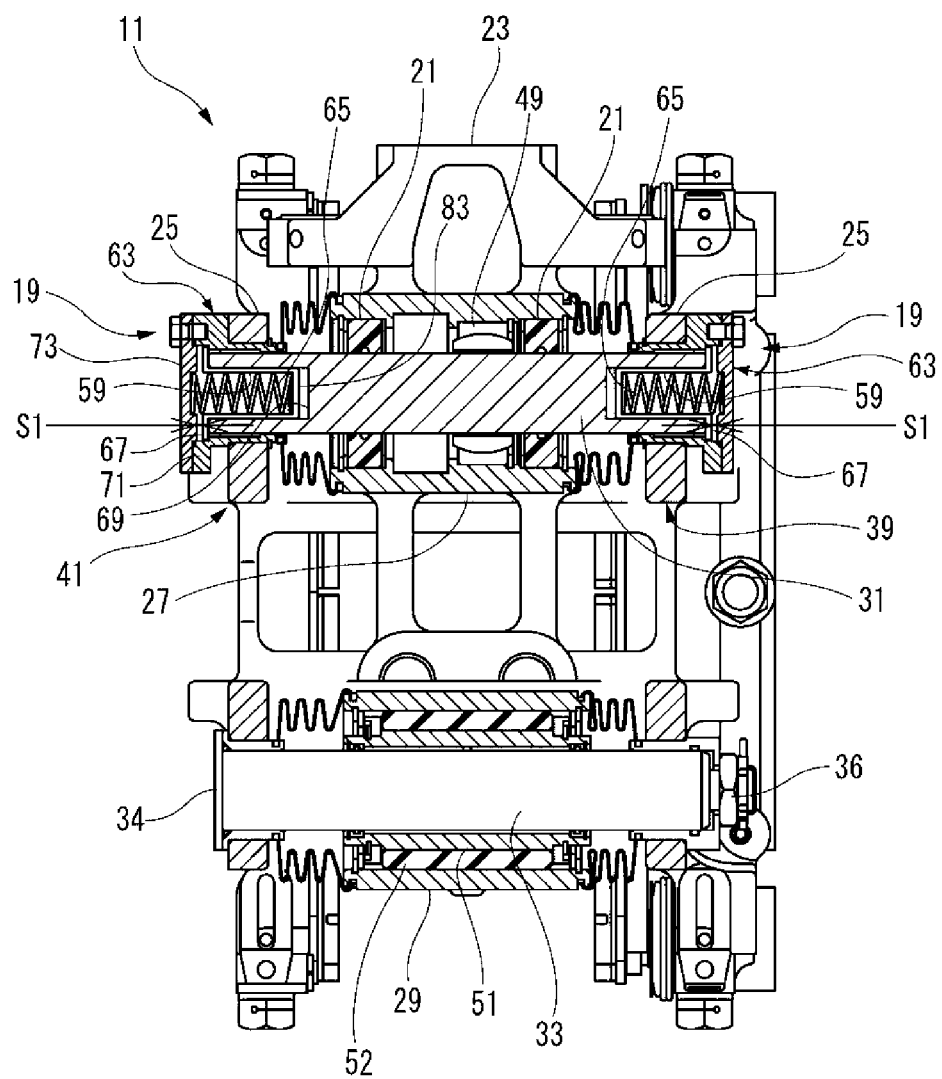
FIG. 4 is a cross-sectional view taken along line A-A in FIG. 3.

As illustrated in FIG. 4, a rubber bush 52 and a sleeve 51 are interposed between the lower stage guide pin 33 and the lower stage tubular supporting portion 29. The lower stage guide pin 33 is supported to be capable of sliding in the axial direction with respect to the lower stage tubular supporting portion 29 via the rubber bush 52 and the sleeve 51 instead of the aligning bearing 49.

The pair of friction rubber rings 21 are arranged on both sides of the aligning bearing 49 in the axial direction in the inner peripheral surface of the upper stage tubular supporting portion 27. The pair of friction rubber rings 21 are fitted into the upper stage tubular supporting portion 27 and slidably and elastically support the upper stage guide pin 31.

The washer members 43 are arranged on both of the sides of the friction rubber rings 21 in the axial direction and regulate a movement of the friction rubber rings 21 in the axial direction. In this first embodiment, the movement of the friction rubber rings 21 to one side in the axial direction is regulated by a stepped portion 53 that is formed in the inner peripheral surface of the upper stage tubular supporting portion 27 and the movement of the friction rubber rings 21 to the other side in the axial direction is regulated by a snap ring 55 as illustrated in FIG. 5. In this manner, the pair of friction rubber rings 21 are fixed to the inner peripheral surface of the upper stage tubular supporting portion 27 in a state where the movement in the axial direction is regulated.

Those that have a shape and a material with a high elastic region (deformation amount) and return force (retraction effect) are selected as the friction rubber rings 21. In this first embodiment, cross-sectional shapes formed by planes including axes of the friction rubber rings 21 are formed into U-shaped cross-sectional shapes that have annular grooves 57 which are capable of holding grease in the inner peripheral surface. As illustrated in FIG. 5, a pair of projection portion tips of the friction rubber rings 21 on the inner peripheral surface side having the annular grooves 57 are in sliding contact with an outer peripheral surface of the upper stage guide pin 31. A high-performance grease mixed with a solidified lubricant such as molybdenum disulfide can be held between the projection portion tips of the friction rubber rings 21 and the outer peripheral surface of the upper stage guide pin 31 so that a sliding resistance value between the projection portion tips of the friction rubber rings 21 and the outer peripheral surface of the upper stage guide pin 31 reaches an appropriate value between 5 kgf to 50 kgf.

The cross-sectional shape of the friction rubber ring 21 according to the present invention is not limited to the U shape as in this first embodiment. Various shapes such as an H-shaped cross-sectional shape can be adopted as the cross-sectional shape of the friction rubber ring 21 according to the present invention insofar as an elastic restoration effect can be adjusted.

The friction rubber rings 21 are formed to have the U-shaped cross-sectional shape and have the elastic restoration effect by the projection portion tips of the friction rubber rings 21 being in sliding contact with the outer peripheral surface of the upper stage guide pin 31. In this manner, a force to return the upper stage guide pin 31 to the side that is opposite to the driving piston side (hereinafter, referred to as an anti-driving piston side) can act during, for example, a slow brake opening following a movement of the upper stage guide pin 31 to the driving piston side with respect to the upper stage tubular supporting portion 27 during braking.

Regarding the type and application or non-application of the high-performance grease, an optimal combination is selected from the tonalities described above.

The caliper return mechanisms 19 according to this first embodiment have spring accommodating members 59 that are mounted in spring accommodating portions 69 which are disposed in both of the end portions of the upper stage guide pin 31, slide bearings 61 for slidably supporting the base portions 25 with respect to the upper stage guide pin 31, spring receiving members 63 that cover openings of the spring accommodating portions 69, and compression spring members 65 that are interposed between the spring receiving members 63 and bottom portions 83 of the spring accommodating members 59.

The spring accommodating members 59 have a bottomed tubular shape and have open end flanges 67 on open end sides. The spring accommodating members 59 are mounted in the spring accommodating portions 69 recessed in a piston side end portion 87 (end portion) and an anti-piston side end portion (end portion) 91 of the upper stage guide pin 31. The open end flanges 67 of the spring accommodating members 59 that are mounted in the spring accommodating portions 69 are engaged with open edges of the spring accommodating portions 69, and insertion into the spring accommodating portions 69 beyond the open edges is regulated. In the description of this first embodiment, an example is described in which compression coil springs are used as the compression spring members 65. However, the compression spring members 65 may be elastic members such as rubber.

The slide bearings 61 have a cylindrical shape, are internally fitted into guide pin supporting portions 71 of the spring receiving members 63, and are placed between the upper stage guide pin 31 and the spring receiving members 63. The slide bearings 61 reduce a sliding resistance of the base portions 25 with respect to the upper stage guide pin 31.

The spring receiving members 63 cover the openings of the spring accommodating portions 69 and are fixed to the base portions 25. As described above, the spring receiving members 63 are capable of sliding with respect to the upper stage guide pin 31 via the slide bearings 61. In this first embodiment, the spring receiving members 63 have the guide pin supporting portions 71 and spring supporting portions 73.

The guide pin supporting portions 71 have a cylindrical shape, and are fixed to the base portions 25 so as to slidably support the upper stage guide pin 31 via the slide bearings 61. This fixing is performed by flange portions 75 of the guide pin supporting portions 71 that abut against the base portions 25 and are illustrated in FIG. 5 and retaining rings 77 that are engaged with the guide pin supporting portions 71 on the side opposite to the flange portions 75 across the base portions 25. In addition, detent mechanisms are disposed between the guide pin supporting portions 71 and the base portions 25 so that a relative rotation of the guide pin supporting portions 71 and the base portions 25 is regulated by cut-out portions 76 of the flange portions 75 being engaged with engaging ribs 78 of the base portions 25.

The spring supporting portions 73 are fixed to the guide pin supporting portions 71 by a plurality of bolts 79 so as to cover outside open ends of the guide pin supporting portions 71 while abutting against ends of the compression spring members 65. O-rings 81 are mounted between the flange portions 75 of the guide pin supporting portions 71 and the spring supporting portions 73. The O-rings 81 seal parts where the guide pin supporting portions 71 and the spring supporting portions 73 are aligned with each other in a watertight manner and prevents intrusion of water and dust into the spring accommodating portions 69 and the spring accommodating members 59.

As illustrated in FIGS. 4 and 5, the compression spring members 65 are accommodated in the spring accommodating members 59. The ends of the compression spring members 65 that are accommodated in the spring accommodating members 59 abut against the bottom portions 83 of the spring accommodating members 59, and the other ends of the compression spring members 65 that are accommodated in the spring accommodating members 59 abut against the spring supporting portions 73 of the spring receiving members 63. The compression spring members 65 are interposed between the spring receiving members 63 that have a predetermined gap S1 from the open end flanges 67 and the bottom portions 83 of the spring accommodating members 59.

The caliper return mechanisms 19 also have stopper portions 85 (refer to FIG. 5). The stopper portions 85 are formed in a stepped portion shape in inner peripheries of the guide pin supporting portions 71. By abutting against the open end flanges 67 of the spring accommodating members 59, the stopper portions 85 regulate a movement of the spring accommodating members 59 in the axial direction with respect to the base portions 25 to the predetermined gap S1 via the guide pin supporting portions 71. In other words, the movement of the spring accommodating members 59 in the caliper return mechanisms 19 is regulated to the predetermined gap S1 by the stopper portions 85 of the guide pin supporting portions 71 in the spring receiving members 63. During braking, a gap (interference avoidance gap) S2 illustrated in FIG. 5 is formed between the open end flange 67 of the spring accommodating member 59 in the caliper return mechanism 19 on the driving piston side and the piston side end portion 87 of the upper stage guide pin 31 by a movement of the floating caliper 13 to the driving piston side.

A force relationship that is required for a caliper return force in the disk brake 11 which has the above-described configuration is as follows. Assuming that F1 is a sliding resistance between the upper stage guide pin 31 and the support 23 (aligning bearing 49, friction rubber ring 21), F2 is a spring force of the compression spring member 65, F3 is a sliding resistance between the lower stage guide pin 33 and the support 23 (sleeve 51), and F4 is a sliding resistance between the slide bearings 61 in both of the end portions of the upper stage guide pin 31, the force relationship is set to satisfy $F1>F2>(F3+F4)$.

An effect of the disk brake 11 that has the above-described configuration will be described below.

One of the brake pads 17 (left one in FIGS. 6A to 6C) of the floating caliper type disk brake 11 according to this first embodiment is pressed against the disk rotor 37 when the driving piston 15 that is disposed in the tip portion of the piston side pressing arm 39 is driven. Then, the brake pad 17 receives a reaction force from the disk rotor 37.

The reaction force that is received by the brake pad 17 causes the piston side pressing arm 39 to be moved away from the disk rotor 37 (leftwards in FIG. 5).

As a result of this movement, the base portion 25 on the anti-piston side pressing arm 41 side causes the spring receiving member 63 on the anti-driving piston side (right side in FIG. 5) to move and approach the disk rotor 37 (leftwards in FIG. 5) and the base portion 25 on the piston side pressing arm 39 side causes the spring receiving member 63 on the driving piston side (left side in FIG. 5) to move away from the disk rotor 37 (leftwards in FIG. 5) in the floating caliper 13 as illustrated in FIG. 5.

As a result of this movement of the floating caliper 13, the compression spring member 65 that is accommodated in the spring accommodating member 59 of the spring receiving member 63 on the anti-driving piston side is compressively deformed. As a result, the caliper return force is accumulated in the caliper return mechanism 19 that is arranged on the anti-driving piston side. During compression of the compression spring member 65, the spring receiving member 63 is moved with the sliding resistance reduced in a direction axially along an outer periphery of the upper stage guide pin 31 by the slide bearing 61. As a result of this movement of the spring receiving member 63, the spring supporting portion 73 on the anti-driving piston side abuts against the open end flange 67 engaged with the anti-piston side end portion 91 of the upper stage guide pin 31 as illustrated in FIG. 5.

As a result of the movement of the floating caliper 13 described above, the piston side pressing arm 39 causes the spring receiving member 63 on the driving piston side to move away from the disk rotor 37. Then, the spring accommodating member 59 on the driving piston side is moved to be pulled out from the spring accommodating portion 69 of the upper stage guide pin 31 with the open end flange 67 pressed against the stopper portion 85 of the spring receiving member 63. Then, the gap (interference avoidance gap) S2 is formed between the open end flange 67 and the piston side end portion 87 (refer to FIG. 5) of the upper stage guide pin 31. In addition, a biasing force of the compression spring member 65 causes the open end flange 67 to remain in abutment with the stopper portion 85 while being arranged away from the spring supporting portion 73, and thus the spring force of the compression spring member 65 on the driving piston side does not affect the compressive deformation of the compression spring member 65 on the anti-driving piston side. The above description relates to a state during braking.

The driving piston 15 is retracted after the slow braking opening. Then, a reaction force in a direction away from the disk rotor 37 does not act on the piston side pressing arm 39, and the compression spring member 65 compressively deformed on the anti-piston side pressing arm 41 side is elastically restored. The elastically restored compression spring member 65 presses the spring supporting portion 73 in a direction away from the open end flange 67. Because of a force of this elastic restoration, the spring receiving member 63 on the anti-driving piston side is moved away from the disk rotor 37 (rightwards in FIG. 5) by the slide bearing 61. This movement of the spring receiving member 63 on the anti-driving piston side causes the anti-piston side pressing arm 41 to move away from the disk rotor 37. As a result, the floating caliper 13 returns to a pre-braking (initial) state, and the pair of brake pads 17 are separated from the respective disk rotors 37 with the same clearance as that prior to braking.

During the slow braking opening, the piston side pressing arm 39 causes the spring receiving member 63 on the driving piston side to move and approach the disk rotor 37. The interference avoidance gap S2 described above is formed between the open end flange 67 and the piston side end portion 87 of the upper stage guide pin 31. Accordingly, an elastic force of the compression spring member 65 on the driving piston side does not act as a reaction force (load) against the caliper return force.

As illustrated in FIG. 6A, a clearance d between the respective brake pads 17 and disk rotors 37 is 3 mm before braking (initial state). During the braking that is illustrated in FIG. 6B, the driving piston 15 protrudes by 6 mm (piston stroke s=6 mm), and thus the base portion 25 is moved by 3 mm by a reaction force in the direction which is reverse to the direction in which the driving piston 15 protrudes. In this case, the caliper return mechanism 19 is moved without the upper stage guide pin 31 moving, and thus the compression spring member 65 on the anti-driving piston side is compressively deformed. A restoring force attributable to the deformation of the compression spring member 65 creates a force to return the floating caliper 13 (retraction effect). Accordingly, after the slow brake opening, the driving piston 15 is pulled back by 6 mm and the floating caliper 13 moves by 3 mm to the anti-piston side at the same time, and the clearance between the pads becomes 3 mm as illustrated in FIG. 6C. In the case of lining wear, the amount of the lining wear is shown as the amount of deviation between the support 23 and the upper stage guide pin 31 after the slow brake opening.

An effect of the disk brake 11 that has the above-described configuration during a vehicle wheel oscillation will be described below.

The vehicle wheel 35 of the railway vehicle oscillates with respect to the floating caliper 13 that is fixed to the bogie frame during braking for cornering.

In the disk brake 11 that has the above-described configuration, the clearance between both of the brake pads 17 is maintained at the same value even after the vehicle wheel oscillation insofar as the amount of the vehicle wheel oscillation becomes twice the pad clearance even during the vehicle wheel oscillation.

The floating caliper type disk brake 11 according to this first embodiment can ensure a clearance between the pads of 3 mm until the amount of the vehicle wheel oscillation±6 mm.

Table 1 below shows a predicted value of each pad clearance in a case where the vehicle wheel oscillates by at least 6 mm to the piston side. Table 1 shows each pad clearance in a case where the vehicle wheel 35 is moved to the driving piston side due to the oscillation of the vehicle wheel 35 and then the vehicle wheel 35 returns to a pre-movement position.

Regarding the operation of the floating caliper 13 during the oscillation, the respective clearances in Table 1 (piston side clearance and anti-piston side clearance) are reversed in a case where the vehicle wheel 35 is moved to the anti-piston side.

In a case where the amount of the vehicle wheel oscillation exceeds 9 mm, a pressing force of the brake pad 17 against the disk rotor 37 is generated by the compressive deformation of the compression spring member 65 on the driving piston side.

TABLE 1

| | | Amount of vehicle wheel oscillation | | | | |
|---|---|---|---|---|---|---|
| | | 6 mm | 7 mm | 8 mm | 9 mm | 10 mm |
| Pad clearance | Piston side | 3 mm | 4 mm | 5 mm | 6 mm | 6 mm |
| | Anti-piston side | 3 mm | 2 mm | 1 mm | 0 mm (pad and disk in contact) | 0 mm (pad and disk in contact and pressing force generated) |

In the initial state of the disk brake 11, the amount of deviation between the support 23 and the base portion 25 becomes 3 mm and the amount of deviation between the vehicle wheel 35 and the base portion 25 becomes 3 mm when the vehicle wheel 35 oscillates by 6 mm in the direction of the driving piston compared to the initial state. In this case, a return force of 3 mm is generated in the caliper return mechanism 19 on the driving piston side. The disk brake 11 can ensure a clearance between the pads of 3 mm after the oscillation is removed.

In addition, in the initial state of the disk brake 11, the amount of deviation between the support 23 and the base portion 25 becomes 7 mm and the amount of deviation between the vehicle wheel 35 and the base portion 25 becomes 3 mm when the vehicle wheel 35 oscillates by 10 mm in the direction of the driving piston compared to the initial state.

In the case of a vehicle wheel return amount of 6 mm, the amount of deviation between the support 23 and the base portion 25 becomes 4 mm and the amount of deviation between the vehicle wheel 35 and the base portion 25 becomes 0 mm. Then, the disk rotor 37 and the brake pad 17 have a pad clearance of 3 mm.

In the case of a vehicle wheel return amount of 9 mm, the amount of deviation between the support 23 and the base portion 25 becomes 4 mm and the amount of deviation between the vehicle wheel 35 and the base portion 25 becomes 0 mm. Then, the vehicle wheel 35 has a remaining amount of movement of 1 mm, and the disk rotor 37 abuts against the brake pad 17. By the vehicle wheel 35 moving by this remaining amount of movement of 1 mm, the compression spring member 65 on the driving piston side is deflected and the pressing force of the brake pad 17 against the disk rotor 37 is generated.

Figures 7A, 7B:
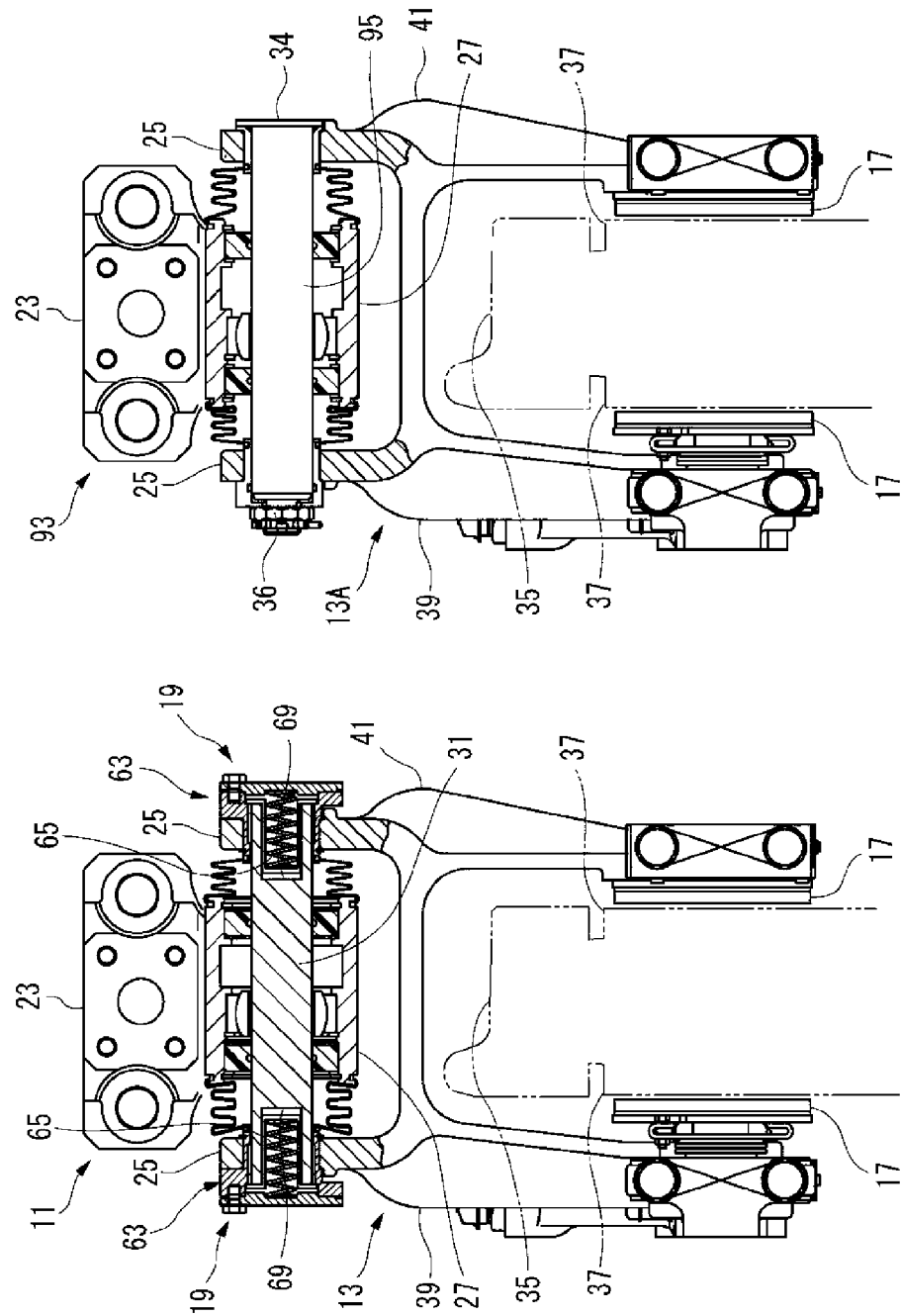
FIG. 7A is a cross-sectional view of the disk brake that is illustrated in FIG. 1.
FIG. 7B is a cross-sectional view of a disk brake according to a comparative example.

FIG. 7A is a cross-sectional view of the disk brake that is illustrated in FIG. 1, and FIG. 7B is a cross-sectional view of a disk brake according to a comparative example.

In the floating caliper type disk brake 11 according to this first embodiment, the caliper return mechanisms 19 are disposed in both of the end portions of the upper stage guide pin 31 that slidably supports the base portions 25 of the floating caliper 13 with respect to the upper stage tubular supporting portion 27 of the support 23 as illustrated in FIG. 7A. The caliper return mechanism 19 on the anti-driving piston side generates the caliper return force between the upper stage guide pin 31 and the floating caliper 13. When braking is released, the caliper return mechanism 19 on the anti-driving piston side separates the pair of brake pads 17 from the disk rotors 37 with the same clearance as that prior to the braking by using this caliper return force. The upper stage guide pin 31 where the caliper return mechanism 19 is disposed may be simply exchanged with an upper stage guide pin 95 of a currently available floating caliper 13A illustrated in FIG. 7B, and an improvement for realizing a pad drag measure with respect to a floating caliper type disk brake 93 can be made without any additional machining of the existing floating caliper 13A.

In the floating caliper type disk brake 11 according to this embodiment, the spring accommodating members 59 (refer to FIG. 5) where the open end flanges 67 are engaged with the open edges of the spring accommodating portions 69 are inserted into the spring accommodating portions 69 that are formed to be open in the end portions of the upper stage guide pin 31. In addition, the compression spring members 65 are accommodated in the respective spring accommodating members 59. The spring receiving members 63 are fixed to the base portions 25 of the floating caliper 13 to cover the openings of the spring accommodating portions 69 while abutting against the other ends of the compression spring members 65 with the ends abutting against the bottom portions 83 of the spring accommodating members 59. Accordingly, when the driving piston 15 is driven and the floating caliper 13 is moved to the driving piston side with respect to the upper stage guide pin 31, the compression spring member 65 of the caliper return mechanism 19 on the anti-driving piston side is compressed. The caliper return mechanism 19 on the anti-driving piston side can obtain the caliper return force based on the elastic restoration force of this compressed compression spring member 65.

In addition, in the floating caliper type disk brake 11 according to this embodiment, the spring receiving members 63 that are fixed to the base portions 25 of the floating caliper 13 are slidably supported by the outer periphery of the upper stage guide pin 31 via the slide bearings 61 (refer to FIG. 5). Accordingly, the base portions 25 of the floating caliper 13 can move with respect to the upper stage guide pin 31 with less force with the sliding resistance reduced by the slide bearings 61.

In addition, in the floating caliper type disk brake 11 according to this embodiment, the guide pin supporting portions 71 that are provided with the slide bearings 61 and are fixed to the base portions 25 and the spring supporting portions 73 that abut against the ends of the compression spring members 65 and are fixed to the guide pin supporting portions 71 constitute the spring receiving members 63 that are fixed to the base portions 25 of the floating caliper 13 (refer to FIG. 5). The compression spring members 65 can be detachable by the spring supporting portions 73 being removed in a state where the guide pin supporting portions 71 of the spring receiving members 63 fixed to the base portions 25 of the floating caliper 13 are slidably supported by the outer periphery of the upper stage guide pin 31. Accordingly, the return force and return amount of the floating caliper 13 can be very easily adjusted by the spring supporting portions 73 and the compression spring members 65 being exchanged with those with different specifications (predetermined gap S1, spring constant, and the like).

In addition, in the floating caliper type disk brake 11 according to this embodiment, the caliper return mechanisms 19 are arranged in the both of the end portions of the upper stage guide pin 31, and thus the force to return the base portion 25 of the floating caliper 13 to the anti-driving piston side that is required during, for example, the oscillation of the vehicle wheel 35 can be produced.

When the driving piston 15 is driven and the floating caliper 13 is moved to the driving piston side with respect to the upper stage guide pin 31 during braking, the compression spring member 65 of the caliper return mechanism 19 disposed in the end portion of the upper stage guide pin 31 on the anti-driving piston side is compressed and generates the caliper return force. In this case, a movement of the spring accommodating member 59 of the caliper return mechanism 19 arranged in the end portion of the upper stage guide pin 31 on the driving piston side is regulated to the predetermined gap S1 by the stopper portion 85 of the spring receiving member 63, and thus the gap (interference avoidance gap) S2 is formed between the open end flange 67 of the spring accommodating member 59 in the caliper return mechanism 19 on the driving piston side and the piston side end portion 87 of the upper stage guide pin 31 by the movement of the floating caliper 13 to the driving piston side. The elastic force of the compression spring member 65 in the caliper return mechanism 19 on the driving piston side does not interfere with the caliper return force of the compression spring member 65 in the caliper return mechanism 19 on the anti-driving piston side and does not act as the reaction force (load) against the caliper return force.

In the disk brake for a railway vehicle according to this first embodiment, the above-described configuration of the disk brake 11 allows a constant pad clearance to be maintained between the brake pads 17 and the disk rotors 37 when braking is performed by the brake pads 17 being pressed against the disk rotors 37 which are mounted on both of the side surfaces of the vehicle wheel 35 for a railway vehicle. Accordingly, uneven wear and drag of the brake pads 17 can be prevented and an increase in vehicle starting torque can be suppressed.

Hereinafter, a floating caliper type disk brake according to a second embodiment of the present invention will be described.

The same reference numerals will be used to refer to members common to the floating caliper type disk brake according to this second embodiment and the floating caliper type disk brake according to the first embodiment described above, and repeated description thereof will be omitted.

Figure 8:
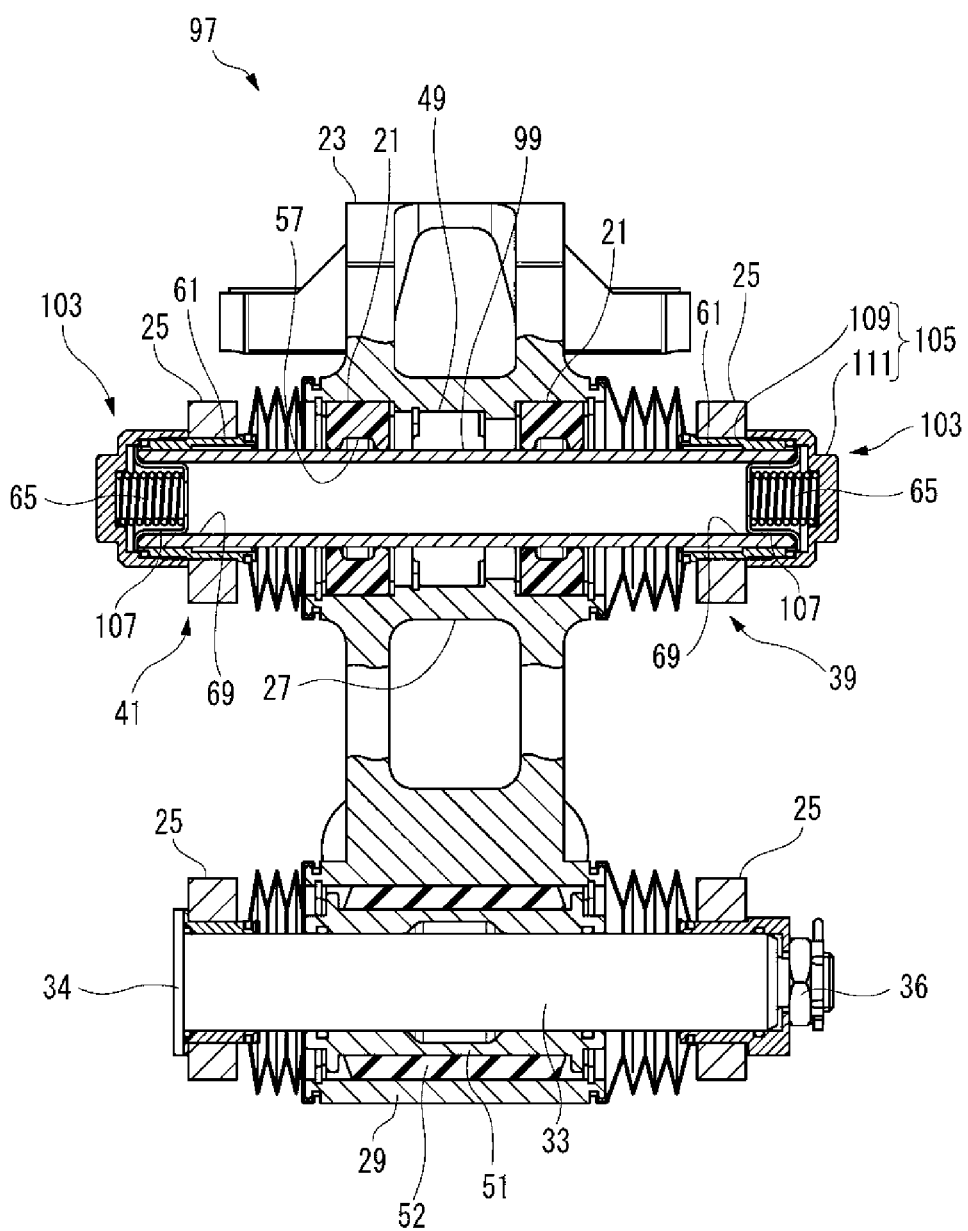
FIG. 8 is a cross-sectional view of a disk brake according to a second embodiment of the present invention.
Figure 9:
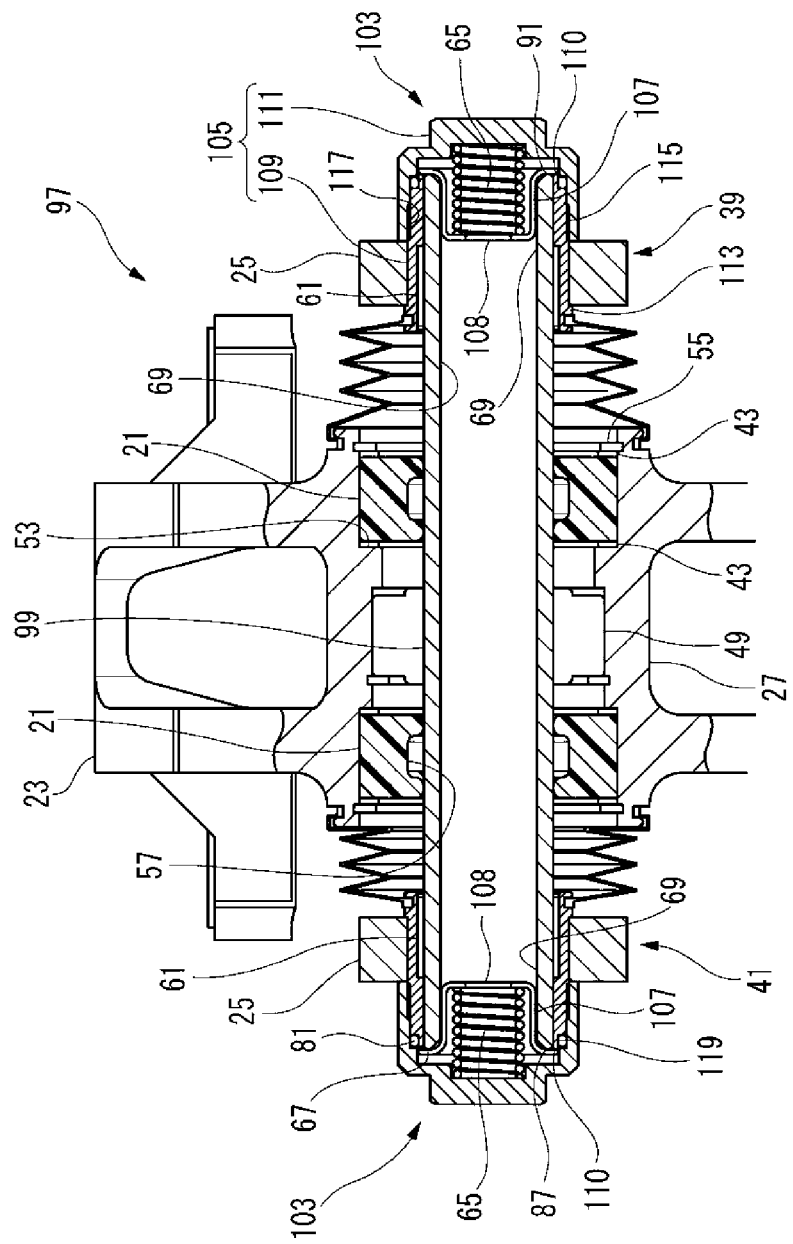
FIG. 9 is an enlarged view of a main section in FIG. 8.

In a floating caliper type disk brake 97 according to this second embodiment, caliper return mechanisms 103 are arranged in respective end portions of an upper stage guide pin 99 as illustrated in FIGS. 8 and 9. The upper stage guide pin 99 is formed as a hollow pipe.

The caliper return mechanisms 103 according to this second embodiment have spring accommodating members 107 that are mounted in the spring accommodating portions 69 which are disposed in both end openings of the upper stage guide pin 99, the slide bearings 61 for slidably supporting the base portions 25 with respect to the upper stage guide pin 99, spring receiving members 105 that cover the openings of the upper stage guide pin 99 which are the spring accommodating portions 69, and compression spring members 65 that are interposed between the spring receiving members 105 and bottom portions 108 of the spring accommodating members 107.

The slide bearings 61 have a cylindrical shape, are internally fitted into guide pin supporting portions 109 of the spring receiving members 105, and are placed between the upper stage guide pin 99 and the spring receiving members 105. The spring receiving members 105 are slidably and externally inserted on outer peripheral sides at both ends of the upper stage guide pin 99. The spring receiving members 105 have the tubular guide pin supporting portions 109 and cap nut-shaped spring supporting portions 111. The guide pin supporting portions 109 have inner peripheries externally inserted on outer peripheries of the slide bearings 61. Retaining protrusions 113 are formed in end portions of the guide pin supporting portions 109 on the aligning bearing 49 side. The retaining protrusions 113 regulate an outward escape of the guide pin supporting portions 109 from the base portions 25.

Male screw portions 115 are formed in outer peripheries of the guide pin supporting portions 109 penetrating the base portions 25. Female screw portions 117 of the spring supporting portions 111 are screwed with the male screw portions 115. In other words, the spring supporting portions 111 pinch the base portions 25 with the retaining protrusions 113 by being screwed with the male screw portions 115 of the guide pin supporting portions 109 penetrating the base portions 25 outwards. In this manner, the spring receiving members 105 are integrally fixed with the base portions 25. The spring receiving members 105 integrally fixed with the base portions 25 are capable of sliding on the upper stage guide pin 99 via the slide bearings 61. In other words, the base portions 25 are slidably supported with respect to the upper stage guide pin 99 via the spring receiving members 105.

The spring accommodating members 107 that are formed into a bottomed tubular shape are inserted into hollow portions in the upper stage guide pin 99 that are the spring accommodating portions 69. The open end flanges 67 are disposed on open end sides of the spring accommodating members 107. The open end flanges 67 of the spring accommodating members 107 that are mounted in the spring accommodating portions 69 are engaged with open edges of the upper stage guide pin 99, and insertion into the spring accommodating portions 69 beyond the open edges is regulated. In addition, outer peripheral ends of the open end flanges 67 can abut against end faces 110 of the guide pin supporting portions 109 on the spring supporting portion 111 sides.

In the caliper return mechanisms 103 according to this second embodiment, O-ring mounting portions 119 with a reduced outer diameter are formed in end portions of the guide pin supporting portions 109 on the spring supporting portion 111 sides. The O-rings 81 are mounted on the O-ring mounting portions 119.

The end faces 110 of the guide pin supporting portions 109 on sides closer to a central axis than the O-ring mounting portions 119 have a function similar to that of the stopper portions 85 according to the first embodiment described above.

An effect of the disk brake 97 that has the above-described configuration will be described below.

One of the brake pads 17 of the floating caliper type disk brake 97 according to this second embodiment is pressed against the disk rotor 37 when the driving piston 15 (refer to the partial broken portion in FIG. 6A) that is disposed in the tip portion of the piston side pressing arm 39 is driven. Then, the brake pad 17 receives the reaction force from the disk rotor 37.

The reaction force that is received by the brake pad 17 causes the piston side pressing arm 39 to be moved away from the disk rotor 37 (rightwards in FIG. 9).

As a result of this movement, the base portion 25 on the anti-piston side pressing arm 41 side causes the spring receiving member 105 on the anti-driving piston side (left side in FIG. 9) to move and approach the disk rotor 37 (rightwards in FIG. 9) and the base portion 25 on the piston side pressing arm 39 side causes the spring receiving member 105 on the driving piston side (right side in FIG. 9) to move away from the disk rotor 37 (rightwards in FIG. 9) in the floating caliper 13.

As a result of this movement of the floating caliper 13, the compression spring member 65 that is accommodated in the spring accommodating member 107 of the spring receiving member 105 on the anti-driving piston side is compressively deformed. As a result, the caliper return force is accumulated in the caliper return mechanism 103 that is arranged on the anti-driving piston side. During the compression of the compression spring member 65, the spring receiving member 105 is moved with the sliding resistance reduced in a direction axially along an outer periphery of the upper stage guide pin 99 by the slide bearing 61. As a result of this movement of the spring receiving member 105, the spring supporting portion 111 on the anti-driving piston side abuts against the open end flange 67 engaged with the anti-piston side end portion 91 of the upper stage guide pin 99.

As a result of the movement of the floating caliper 13 described above, the piston side pressing arm 39 causes the spring receiving member 105 on the driving piston side to move away from the disk rotor 37. Then, the spring accommodating member 107 on the driving piston side is moved to be pulled out from the spring accommodating portion 69 of the upper stage guide pin 99 with the open end flange 67 pressed against the end face 110 of the spring receiving member 105. Then, a gap (interference avoidance gap) is formed between the open end flange 67 and the piston side end portion 87 of the upper stage guide pin 99. In addition, the biasing force of the compression spring member 65 causes the open end flange 67 to remain in abutment with the end face 110 while being arranged away from the spring supporting portion 111, and thus the spring force of the compression spring member 65 on the driving piston side does not affect the compressive deformation of the compression spring member 65 on the anti-driving piston side. The above description relates to a state during braking.

The driving piston 15 is retracted after the slow braking opening. Then, the reaction force in the direction away from the disk rotor 37 does not act on the piston side pressing arm 39, and the compression spring member 65 compressively deformed on the anti-piston side pressing arm 41 side is elastically restored. The elastically restored compression spring member 65 presses the spring supporting portion 111 in the direction away from the open end flange 67 (leftwards in FIG. 9). Because of the force of this elastic restoration, the spring receiving member 105 on the anti-driving piston side is moved away from the disk rotor 37 by the slide bearing 61. This movement of the spring receiving member 105 on the anti-piston side causes the anti-piston side pressing arm 41 to move away from the disk rotor 37. As a result, the floating caliper 13 returns to the pre-braking (initial) state, and the pair of brake pads 17 are separated from the respective disk rotors 37 with the same clearance as that prior to braking.

The floating caliper type disk brake 97 according to this second embodiment uses the hollow pipe as the upper stage guide pin 99, and thus can be light in weight.

In addition, since the spring supporting portions 111 of the spring receiving members 105 have a cap nut shape, the caliper return mechanisms 103 can be provided with high levels of dust resistance and waterproofness. In addition, the compression spring members 65 can be detachable by the spring supporting portions 111 being removed in a state where the guide pin supporting portions 109 of the spring receiving members 105 fixed to the base portions 25 of the floating caliper 13 are slidably supported by the outer periphery of the upper stage guide pin 99. Accordingly, the return force and return amount of the floating caliper 13 can be very easily adjusted by the spring supporting portions 111 and the compression spring members 65 being exchanged with those with different specifications (predetermined gap S1, spring constant, and the like).

Hereinafter, a floating caliper type disk brake according to a third embodiment of the present invention will be described.

The same reference numerals will be used to refer to members common to the floating caliper type disk brake according to this third embodiment and the floating caliper type disk brake according to the first embodiment described above, and repeated description thereof will be omitted.

Figure 10:
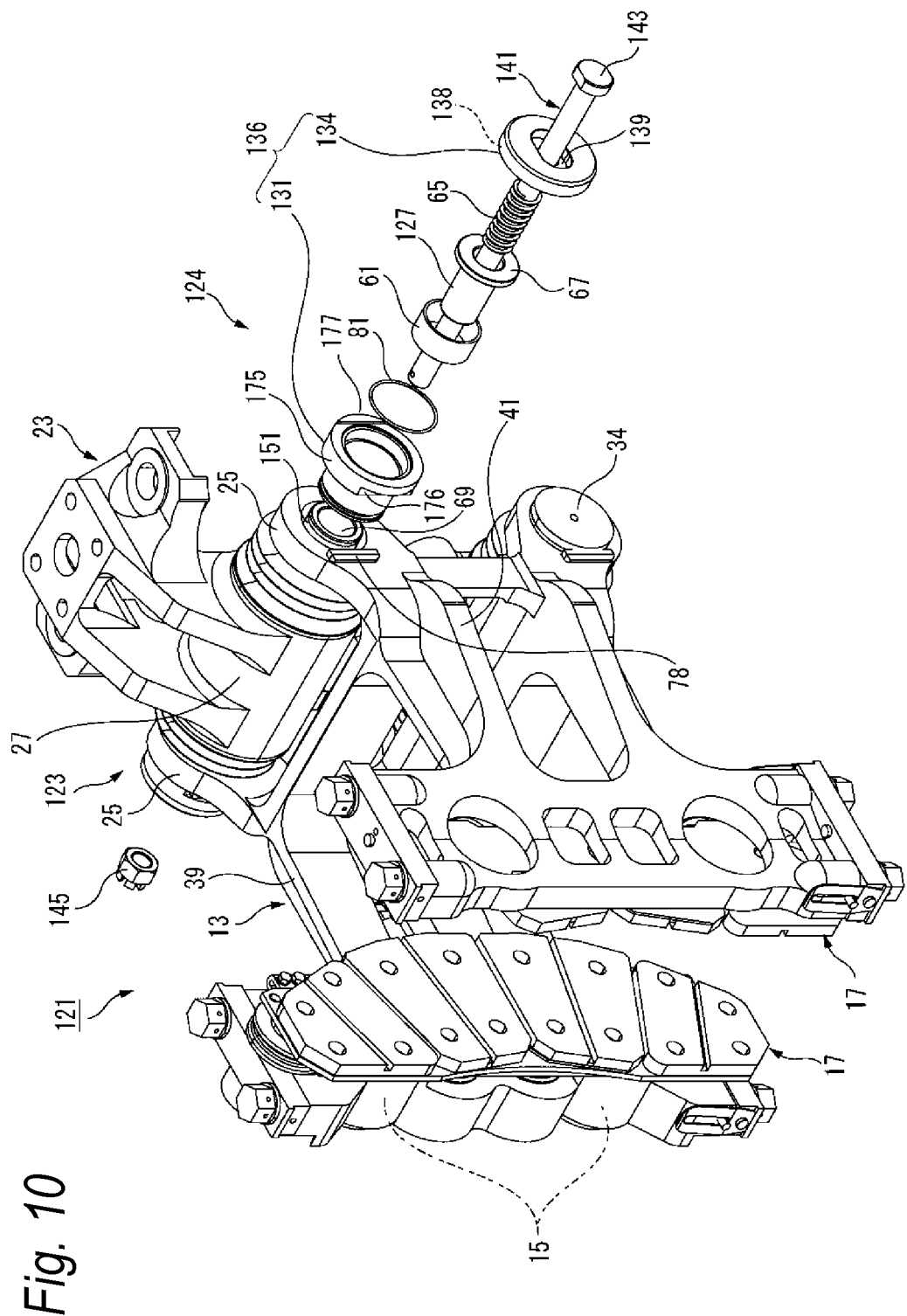
FIG. 10 is an exploded perspective view of a disk brake according to a third embodiment of the present invention.
Figure 11:
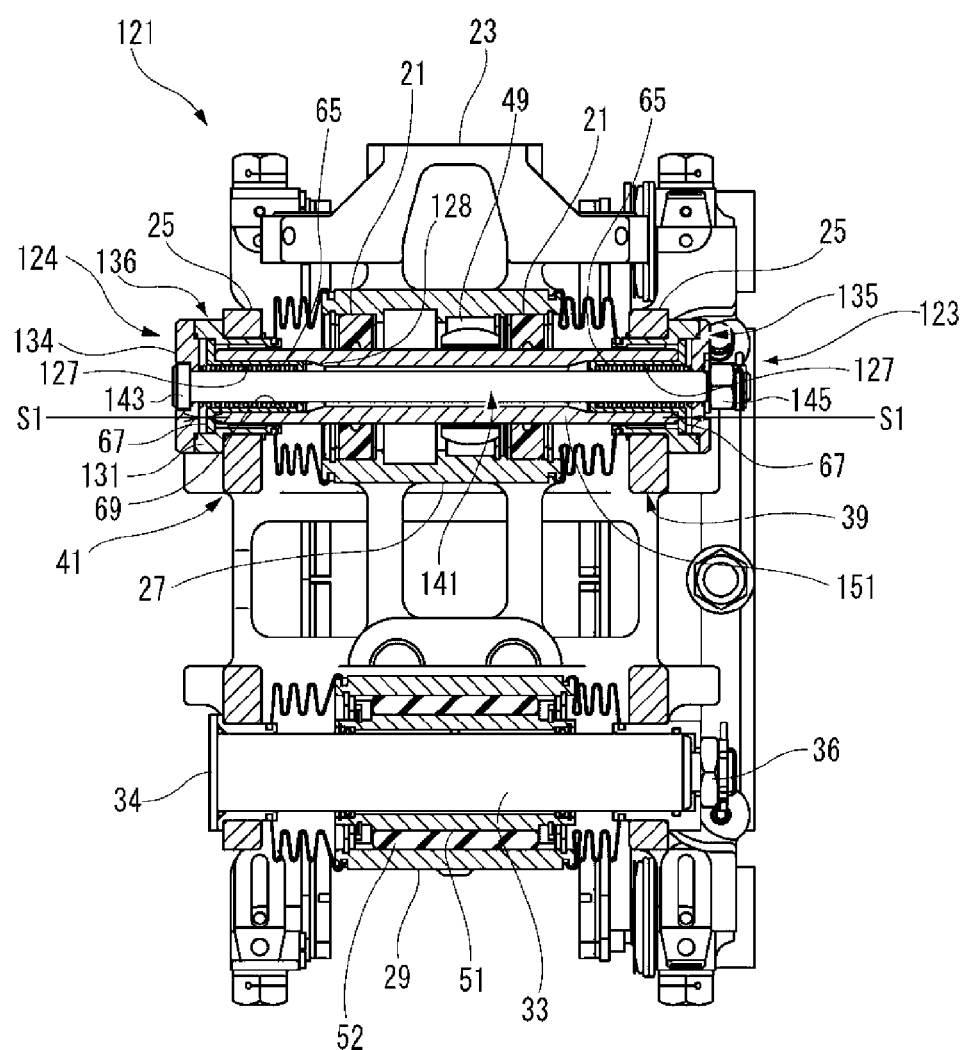
FIG. 11 is a cross-sectional view of the disk brake that is illustrated in FIG. 10.
Figure 12:
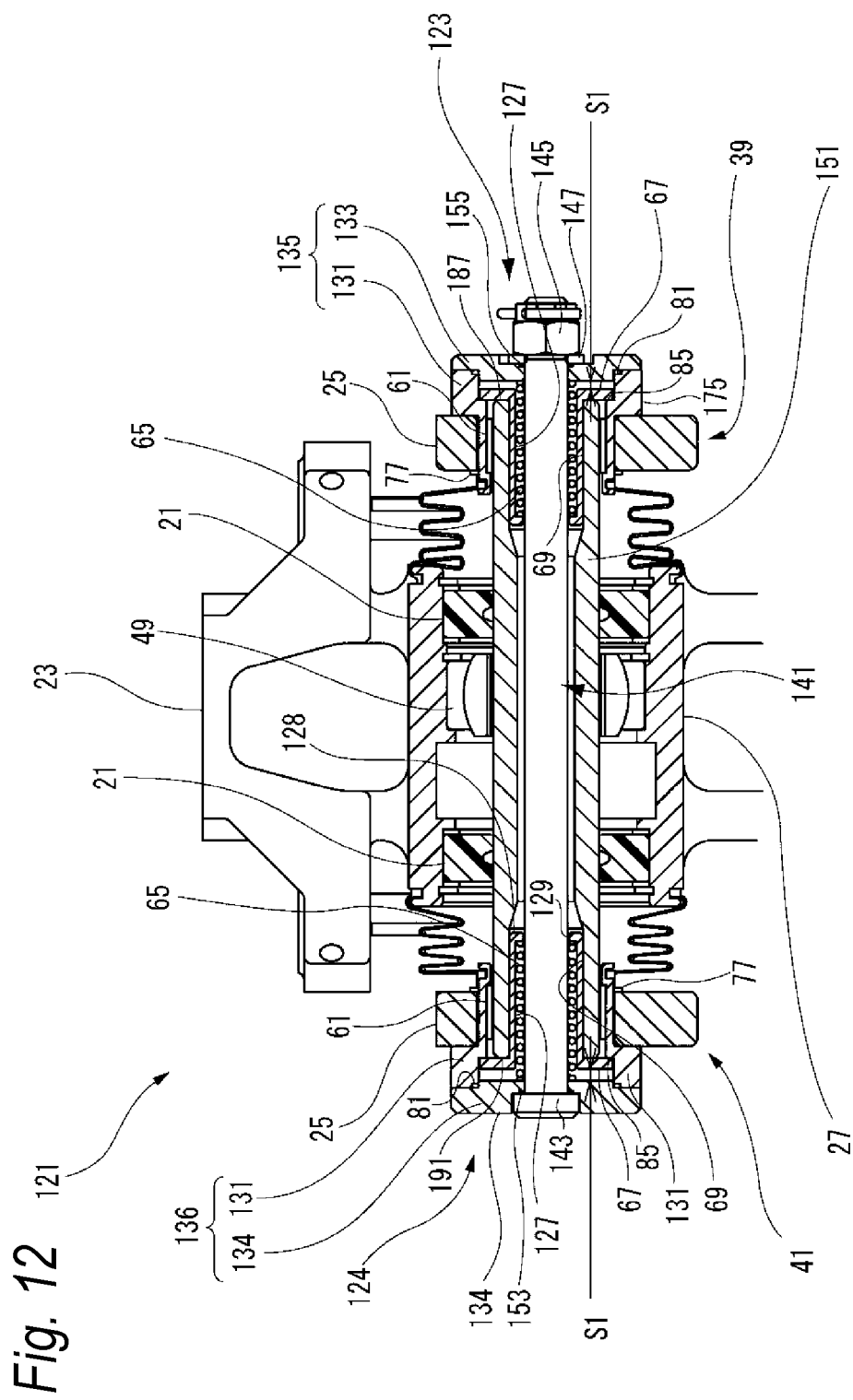
FIG. 12 is an enlarged view of a main section in FIG. 11.
Figure 13A:
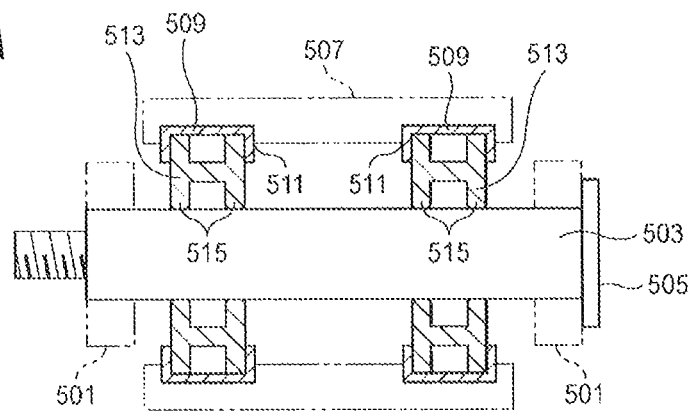
FIG. 13A is a schematic diagram illustrating a posture of a retraction rubber ring with respect to a guide pin during non-braking in a conventional configuration.
Figure 13B:
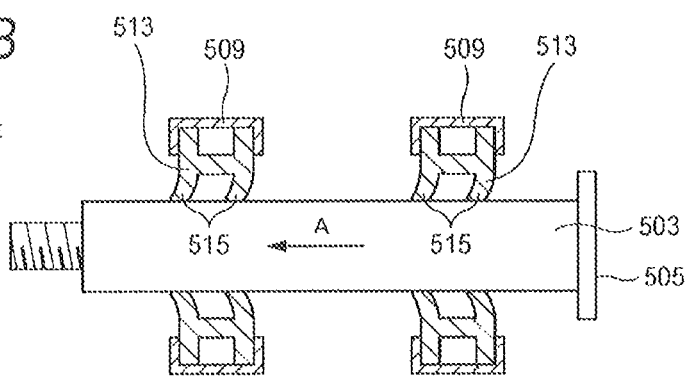
FIG. 13B is a schematic diagram illustrating a deformation of a projection of the retraction rubber ring during braking in FIG. 13A.
Figure 13C:
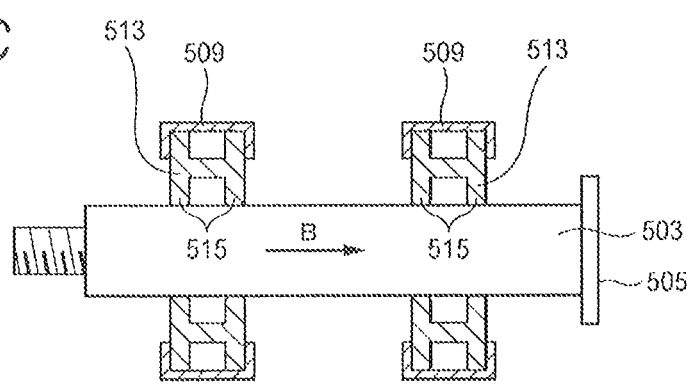
FIG. 13C is a schematic diagram illustrating an effect during repositioning of the retraction rubber ring.

In a floating caliper type disk brake 121 according to this third embodiment, caliper return mechanisms 123 and 124 are arranged in respective end portions of an upper stage guide pin 151 as illustrated in FIGS. 10 to 12. The upper stage guide pin 151 is formed as a hollow pipe.

The caliper return mechanism 123 has a spring accommodating member 127 that is mounted in the spring accommodating portion 69 which is disposed in a piston side end opening (end portion) 187 of the hollow upper stage guide pin 151, the slide bearing 61 for slidably supporting the base portion 25 with respect to the upper stage guide pin 151, a spring receiving member 135 that covers an opening of the upper stage guide pin 151 that is the spring accommodating portion 69, and the compression spring member 65 that is interposed between the spring receiving member 135 and a bottom portion 128 of the spring accommodating member 127.

The caliper return mechanism 124 has the spring accommodating member 127 that is mounted in the spring accommodating portion 69 which is disposed in an anti-piston side end opening (end portion) 191 of the hollow upper stage guide pin 151, the slide bearing 61 for slidably supporting the base portion 25 with respect to the upper stage guide pin 151, a spring receiving member 136 that covers the opening of the upper stage guide pin 151 that is the spring accommodating portion 69, and the compression spring member 65 that is interposed between the spring receiving member 136 and the bottom portion 128 of the spring accommodating member 127.

The slide bearings 61 have a cylindrical shape, are internally fitted into guide pin supporting portions 131 of the spring receiving members 135 and 136, and are placed between the upper stage guide pin 151 and the spring receiving members 135 and 136. The spring receiving members 135 and 136 are slidably and externally inserted on outer peripheral sides at both ends of the upper stage guide pin 151.

The spring receiving member 135 has the tubular guide pin supporting portion 131 and an annular spring supporting portion 133. The spring receiving member 136 has the tubular guide pin supporting portion 131 and an annular spring supporting portion 134.

The guide pin supporting portions 131 have a cylindrical shape, and are fixed to the base portions 25 so as to slidably support the upper stage guide pin 151 via the slide bearings 61. This fixing is performed by flange portions 175 of the guide pin supporting portions 131 that abut against the base portions 25 and the retaining rings 77 that are engaged with the guide pin supporting portions 131 on the side opposite to the flange portions 175 across the base portions 25. In addition, detent mechanisms are disposed between the guide pin supporting portions 131 and the base portions 25 so that a relative rotation of the guide pin supporting portions 131 and the base portions 25 is regulated by cut-out portions 176 of the flange portions 175 being engaged with the engaging ribs 78 of the base portions 25.

In addition, in the caliper return mechanisms 123 and 124, the stopper portions 85 are formed to have a stepped portion shape in inner peripheries of the guide pin supporting portions 131.

The spring supporting portion 133 and the spring supporting portion 134 are fixed to the guide pin supporting portions 131 by a bolt shaft 141 that penetrates an opening 129 in the bottom portion 128 of the spring accommodating member 127 and the hollow upper stage guide pin 151 in a central axial direction and a nut 145 that is screwed with a tip of the bolt shaft 141 so as to cover respective outside open ends of the guide pin supporting portions 131 while abutting against the ends of the compression spring members 65. In this manner, the spring receiving members 135 and 136 are integrally fixed with the base portions 25. The spring receiving members 135 and 136 integrally fixed with the base portions 25 are capable of sliding on the upper stage guide pin 151 via the slide bearings 61. In other words, the base portions 25 are slidably supported with respect to the upper stage guide pin 151 via the spring receiving members 135 and 136.

In the caliper return mechanism 123, an O-ring 155 is mounted between a washer 147 that is clamped by the nut 145 and the spring supporting portion 133. In the caliper return mechanism 124, an O-ring 153 is mounted between a bolt head 143 of the bolt shaft 141 and the spring supporting portion 134. The O-rings 153 and 155 seal respective through-holes of the spring supporting portions 133 and 134 penetrated by the bolt shaft 141 in a watertight manner and prevents intrusion of water and dust into the spring accommodating portions 69 and the spring accommodating members 127.

In addition, a detent mechanism is disposed between the guide pin supporting portion 131 and the spring supporting portion 134 so that a relative rotation of the guide pin supporting portion 131 and the spring supporting portion 134 is regulated by a cut-out portion 138 of the spring supporting portion 134 being engaged with a engaging protrusion 177 of the flange portion 175. In addition, a detent mechanism is disposed between the spring supporting portion 134 and the bolt shaft 141 so that a relative rotation of the spring supporting portion 134 and the bolt shaft 141 is regulated by the bolt head 143 which has a dihedral width being fitted into a fitting recessed portion 139 of the spring supporting portion 134. When the nut 145 is screwed with the tip of the bolt shaft 141, the bolt shaft 141 does not run idle and assemblability is improved.

An effect of the disk brake 121 that has the above-described configuration will be described below.

One of the brake pads 17 of the floating caliper type disk brake 121 according to this third embodiment is pressed against the disk rotor 37 when the driving piston 15 that is disposed in the tip portion of the piston side pressing arm 39 is driven. Then, the brake pad 17 receives the reaction force from the disk rotor 37.

The reaction force that is received by the brake pad 17 causes the piston side pressing arm 39 to be moved away from the disk rotor 37 (rightwards in FIG. 12).

As a result of this movement, the base portion 25 on the anti-piston side pressing arm 41 side causes the spring receiving member 136 on the anti-driving piston side (left side in FIG. 12) to move and approach the disk rotor 37 (rightwards in FIG. 12) and the base portion 25 on the piston side pressing arm 39 side causes the spring receiving member 135 on the driving piston side (right side in FIG. 12) to move away from the disk rotor 37 (rightwards in FIG. 12) in the floating caliper 13.

As a result of this movement of the floating caliper 13, the compression spring member 65 that is accommodated in the spring accommodating member 127 of the spring receiving member 136 on the anti-driving piston side is compressively deformed. As a result, the caliper return force is accumulated in the caliper return mechanism 124 that is arranged on the anti-driving piston side. During the compression of the compression spring member 65, the spring receiving member 136 is moved with the sliding resistance reduced in the direction axially along the outer periphery of the upper stage guide pin 99 by the slide bearing 61. As a result of this movement of the spring receiving member 136, the spring supporting portion 111 on the anti-driving piston side abuts against the open end flange 67 engaged with the anti-piston side end portion 191 of the upper stage guide pin 99.

As a result of the movement of the floating caliper 13 described above, the piston side pressing arm 39 causes the spring receiving member 135 on the driving piston side to move away from the disk rotor 37. Then, the spring accommodating member 127 on the driving piston side is moved to be pulled out from the spring accommodating portion 69 of the upper stage guide pin 151 with the open end flange 67 pressed against the stopper portion 85 of the spring receiving member 135. Then, the gap (interference avoidance gap) is formed between the open end flange 67 and the piston side end portion 187 of the upper stage guide pin 151. In addition, the biasing force of the compression spring member 65 causes the open end flange 67 to remain in abutment with the stopper portion 85 while being arranged away from the spring supporting portion 133, and thus the spring force of the compression spring member 65 on the driving piston side does not affect the compressive deformation of the compression spring member 65 on the anti-driving piston side. The above description relates to a state during braking.

The driving piston 15 is retracted after the slow braking opening. Then, the reaction force in the direction away from the disk rotor 37 does not act on the piston side pressing arm 39, and the compression spring member 65 compressively deformed on the anti-piston side pressing arm 41 side is elastically restored. The elastically restored compression spring member 65 presses the spring supporting portion 134 in the direction away from the open end flange 67 (leftwards in FIG. 9). Because of the force of this elastic restoration, the spring receiving member 136 on the anti-driving piston side is moved away from the disk rotor 37 by the slide bearing 61. This movement of the spring receiving member 136 on the anti-driving piston side causes the anti-piston side pressing arm 41 to move away from the disk rotor 37. As a result, the floating caliper 13 returns to the pre-braking (initial) state, and the pair of brake pads 17 are separated from the respective disk rotors 37 with the same clearance as that prior to braking.

The floating caliper type disk brake 121 according to this third embodiment uses the hollow pipe as the upper stage guide pin 151, and thus can be light in weight.

In addition, the spring supporting portion 133 and the spring supporting portion 134 are fixed to the respective guide pin supporting portions 131 by the bolt shaft 141 that penetrates the opening 129 in the bottom portion 128 of the spring accommodating member 127 and the hollow upper stage guide pin 151 in the central axial direction and the nut 145 that is screwed with the tip of the bolt shaft 141. The number of components required for the spring receiving members 135 and 136 according to this third embodiment can be less than that required for the spring receiving members 63 according to the first embodiment where the spring supporting portions 73 are fixed to the guide pin supporting portions 71 by the plurality of bolts 79.

In addition, the compression spring members 65 can be detachable by the spring supporting portions 133 and 134 being removed in a state where the guide pin supporting portions 131 of the spring receiving members 135 and 136 fixed to the base portions 25 of the floating caliper 13 are slidably supported by an outer periphery of the upper stage guide pin 151. Accordingly, the return force and return amount of the floating caliper 13 can be very easily adjusted by the spring supporting portions 133 and 134 and the compression spring members 65 being exchanged with those with different specifications (predetermined gap S1, spring constant, and the like).

Accordingly, with the floating caliper type disk brakes 11, 97, and 121 and the disk brake for a railway vehicle according to the first to third embodiments described above, the caliper return force can be easily set and a desired caliper return operation can be stably performed, so that the drag of the brake pads 17 cap be reliably prevented.

According to the disk brake of the present invention, the caliper return mechanism is disposed in the end portion of the guide pin on the side opposite to the driving piston side, the guide pin slidably supporting the base portion of the floating caliper with respect to the tubular supporting portion of the support. The caliper return mechanism generates a caliper return force between the guide pin and the floating caliper. When braking is released, the caliper return mechanism separates the pair of pads from the disk rotors with the same clearance as that prior to the braking by using this caliper return force. The guide pin where the caliper return mechanism is disposed may be simply exchanged with a guide pin of a currently available floating caliper, and an improvement for realizing a pad drag measure with respect to a disk brake can be made without any additional machining of the existing floating caliper.

According to the disk brake of the present invention, the spring accommodating member where the open end flange is engaged with the open edge of the spring accommodating portion is inserted into the spring accommodating portion formed to be open in the end portion of the guide pin. In addition, the compression spring member is accommodated in the spring accommodating member. The spring receiving member is fixed to the base portion of the floating caliper to cover the opening of the spring accommodating portion while abutting against the other end of the compression spring member with an end abutting against the bottom portion of the spring accommodating member. Accordingly, when the driving piston is driven and the floating caliper is moved to the driving piston side with respect to the guide pin, the compression spring member is compressed. The caliper return mechanism can obtain the caliper return force based on an elastic restoration force of this compressed compression spring member.

According to the disk brake of the present invention, the spring receiving member fixed to the base portion of the floating caliper is slidably supported by an outer periphery of the guide pin via the slide bearing. Accordingly, the base portion of the floating caliper can move with respect to the guide pin with less force with a sliding resistance reduced by the slide bearing.

According to the disk brake of the present invention, the guide pin supporting portion provided with the slide bearing and fixed to the base portion and the spring supporting portion abutting against the end of the compression spring member and fixed to the guide pin supporting portion constitute the spring receiving member fixed to the base portion of the floating caliper. The compression spring member can be detachable by the spring supporting portion being removed in a state where the guide pin supporting portion of the spring receiving member fixed to the base portion of the floating caliper is slidably supported by the outer periphery of the guide pin. Accordingly, the return force and return amount of the floating caliper can be very easily adjusted by the spring supporting portion and the compression spring member being exchanged with those with different specifications.

According to the disk brake of the present invention, a part where the guide pin supporting portion and the spring supporting portion are aligned with each other can be sealed in a watertight manner by the O-ring, and intrusion of water and dust into the spring accommodating portion and the spring accommodating member can be prevented.

According to the disk brake of the present invention, the caliper return mechanisms are arranged in both of the end portions of the guide pin, and thus a force to return the base portion of the floating caliper to the side opposite to the driving piston side that is required when, for example, a vehicle wheel oscillates can be produced.

When the driving piston is driven and the floating caliper is moved to the driving piston side with respect to the guide pin during braking, the compression spring member of the caliper return mechanism disposed in the end portion of the guide pin on the side opposite to the driving piston side is compressed and generates the caliper return force. In this case, a movement of the spring accommodating member of the caliper return mechanism arranged in the end portion of the guide pin on the driving piston side is regulated to the predetermined gap by the stopper portion of the spring receiving member, and thus a gap (interference avoidance gap) is formed between the open end flange of the spring accommodating member in the caliper return mechanism on the driving piston side and the piston side end portion of the guide pin by the movement of the floating caliper to the driving piston side. An elastic force of the compression spring member in the caliper return mechanism on the driving piston side does not interfere with the caliper return force of the compression spring member in the caliper return mechanism on the side opposite to the driving piston side and does not act as a reaction force (load) against the caliper return force.

According to the disk brake for a railway vehicle of the present invention, the above-described configuration of the disk brake allows a constant pad clearance to be maintained between the brake pads and the disk rotors when braking is performed by the brake pads being pressed against the disk rotors mounted on both side surfaces of the vehicle wheel for the railway vehicle. Accordingly, uneven wear and drag of the brake pads can be prevented and an increase in vehicle starting torque can be suppressed.

The present invention is not limited to the embodiments described above, and appropriate modifications, improvements, and the like can be applied to the present invention. The material, shape, dimension, number, arrangement place, and the like of each of the elements of the embodiments described above are not particularly limited and any material, shape, dimension, number, arrangement place, and the like can be adopted insofar as the present invention can be achieved therewith.

What is claimed is:

1. A disk brake comprising:
    a floating caliper including a base portion which is slidably supported via a guide pin with respect to a tubular supporting portion of a support and a pair of pressing arms which extend from the base portion to positions where the pressing arms pinch a disk rotor from both sides of the disk rotor in an axial direction;
    a pair of brake pads provided in respective tip portions of the pressing arms so as to face side surfaces of the disk rotor;
    a driving piston provided on one of the pressing arms so as to drive one of the brake pads toward one of the side surfaces of the disk rotor; and
    a caliper return mechanism arranged in at least one of both end portions of the guide pin on a side opposite to a side of the driving piston so as to elastically bias the base portion slidably supported by the guide pin on the side opposite to the side of the driving piston.

2. The disk brake according to claim 1, wherein
    the caliper return mechanism includes
    a spring accommodating member which has a bottomed tubular shape, is mounted in a spring accommodating portion disposed in the end portion of the guide pin, and has an open end flange engaged with an edge of an opening of the spring accommodating portion,
    a spring receiving member covering the opening of the spring accommodating portion and fixed to the base portion, and
    a compression spring member interposed between the spring receiving member disposed with a predetermined gap from the open end flange and a bottom portion of the spring accommodating member.

3. The disk brake according to claim 2, wherein
    the spring receiving member includes a slide bearing for slidably supporting the base portion with respect to the guide pin.

4. The disk brake according to claim 3, wherein
    the spring receiving member includes
    a guide pin supporting portion which has cylindrical shape and is fixed to the base portion so that the base portion is slidably supported with respect to the guide pin via the slide bearing, and
    a spring supporting, portion which abuts against an end of the compression spring, member and is fixed to the guide pin supporting portion so as to cover an outside open end of the guide pin supporting portion.

5. The disk brake according claim 4, wherein
    an O-ring is interposed between the guide pin supporting portion and the spring supporting portion.

6. The disk brake according to claim 5, wherein
the spring supporting portion of the caliper return mechanism arranged in each of the end portions of the guide pin is fixed to each of the base portions by a bolt shaft penetrating the bottom portion of the spring accommodating member and the guide pin having hollow shape in a central axial direction and a nut screwed with a tip of the bolt shaft.

7. The disk brake according to claim 6, wherein
O-rings are respectively interposed between the spring supporting portion and the bolt shaft and between the spring supporting portion and the nut.

8. The disk brake according to claim 7, wherein
detent mechanisms are disposed between the guide pin supporting portion and the spring supporting portion and between the spring supporting portion and the bolt shaft so as to regulate relative rotations thereof.

9. The disk brake according to claim 2, wherein
the caliper return mechanism arranged in the end portion of the guide pin on the driving piston side includes a stopper portion, in the spring receiving member, for regulating a movement of the spring accommodating member in the axial direction with respect to the base portion to a predetermined gap.

10. A disk brake for a railway vehicle including the disk brake according to claim 1.

* * * * *